United States Patent [19]

Yamaguchi

[11] Patent Number: 5,781,315
[45] Date of Patent: Jul. 14, 1998

[54] IMAGE PROCESSING METHOD FOR PHOTOGRAPHIC PRINTER

[75] Inventor: Hiroshi Yamaguchi, Kanagawa-ken, Japan

[73] Assignee: Fuji Photo Film Co., Ltd., Kanagawa-ken, Japan

[21] Appl. No.: 746,387

[22] Filed: Nov. 8, 1996

[30] Foreign Application Priority Data

Nov. 9, 1995 [JP] Japan ................... 7-290758
Jan. 16, 1996 [JP] Japan ................... 8-004711

[51] Int. Cl.$^6$ .............. G03F 3/08; H04N 1/46; G06K 9/40
[52] U.S. Cl. .............. 358/520; 358/534; 358/518; 358/519; 358/504; 382/254
[58] Field of Search .............. 358/406, 504, 358/518, 519, 520, 522, 534, 455, 456, 448, 521; 348/671, 674, 675, 254, 256; 382/167, 254, 274; 395/109; 355/77

[56] References Cited

U.S. PATENT DOCUMENTS

| | | |
|---|---|---|
| 4,101,216 | 7/1978 | Grossman .................. 355/77 |
| 4,561,768 | 12/1985 | Fursich et al. ............. 355/77 |
| 4,589,766 | 5/1986 | Fursich et al. ............. 355/77 |
| 4,827,109 | 5/1989 | Matsumoto et al. . |
| 5,081,485 | 1/1992 | Terashita . |

FOREIGN PATENT DOCUMENTS

| | | | |
|---|---|---|---|
| 6-233052 | 8/1994 | Japan | H04N 1/028 |
| 8606850 | 11/1986 | WIPO | |

*Primary Examiner*—Kim Yen Vu
*Assistant Examiner*—Kimberly A. Williams

[57] ABSTRACT

In a photographic printer in which red, green and blue light beams are modulated respectively according to red, green and blue image signals each made up of image signal components representing densities of the corresponding color of respective picture elements obtained by reading out an image recorded on a color photographic film, and a color image is recorded on a color photosensitive material by scanning the photosensitive material with the modulated light beams, the image signals are subjected to a calibration processing for substantially equalizing the gray scales for the respective colors and the processed image signals are subjected to a gray balance adjustment. An exposure condition of the color photographic film is determined on the basis of the image signals. The gray-balance-adjusted image signals are subjected to a processing for compensating for nonlinearity of the exposure-color-forming density characteristics of the color film according to the exposure condition. The thus processed image signals are subjected to a processing for adjusting the brightness of the print according to predetermined characteristics determined on the basis of the scene of photography.

16 Claims, 21 Drawing Sheets

F I G. 2
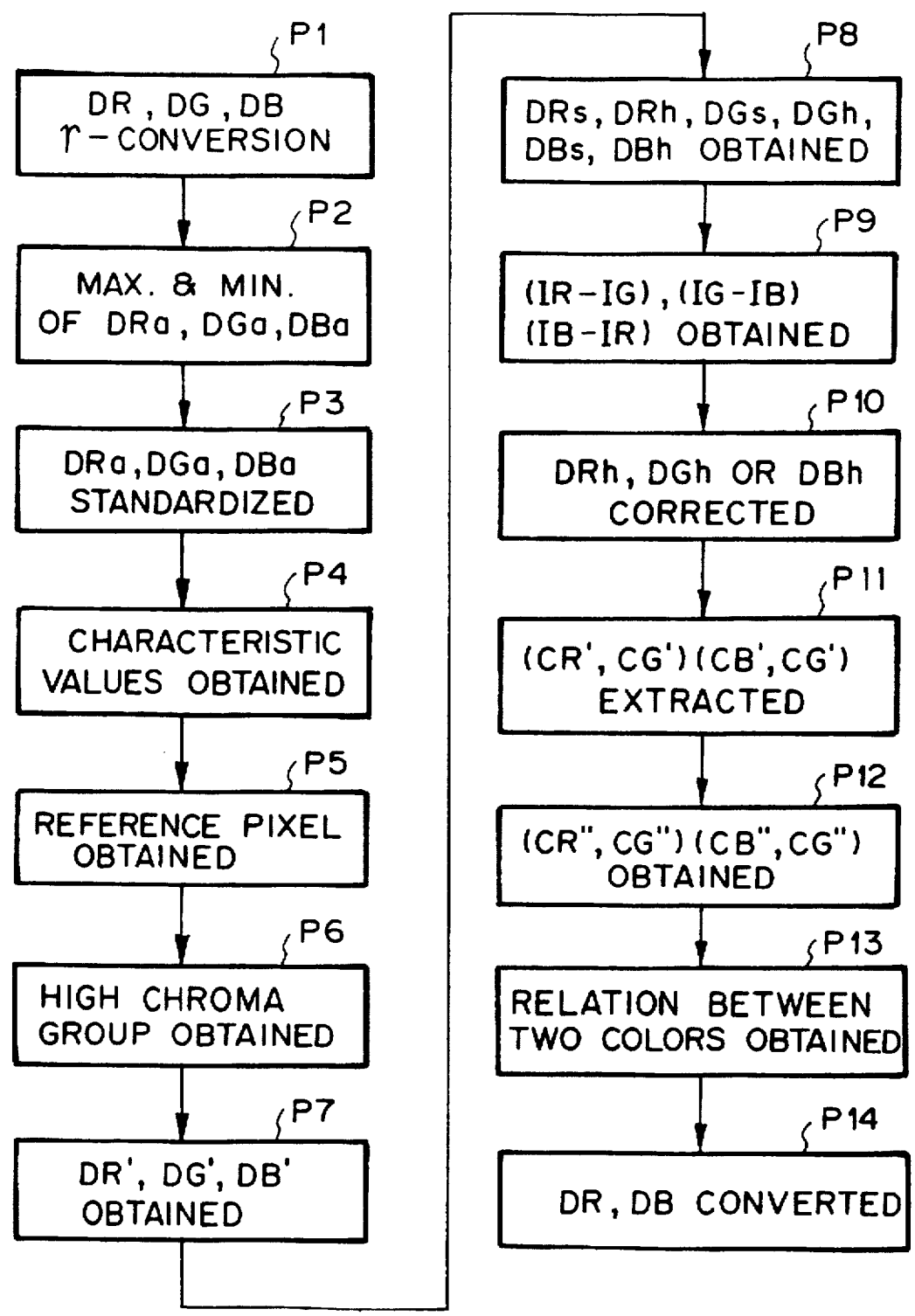

F I G. 4
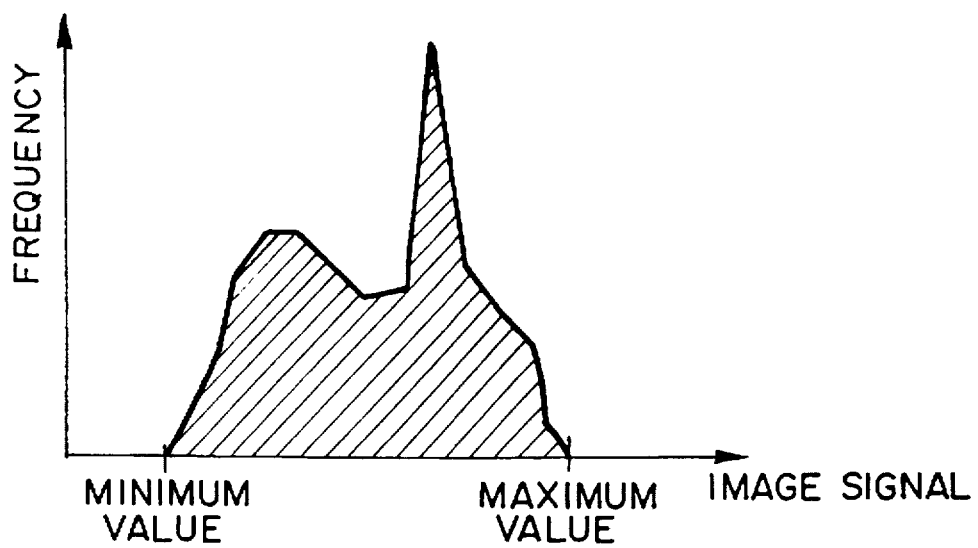
F I G. 5
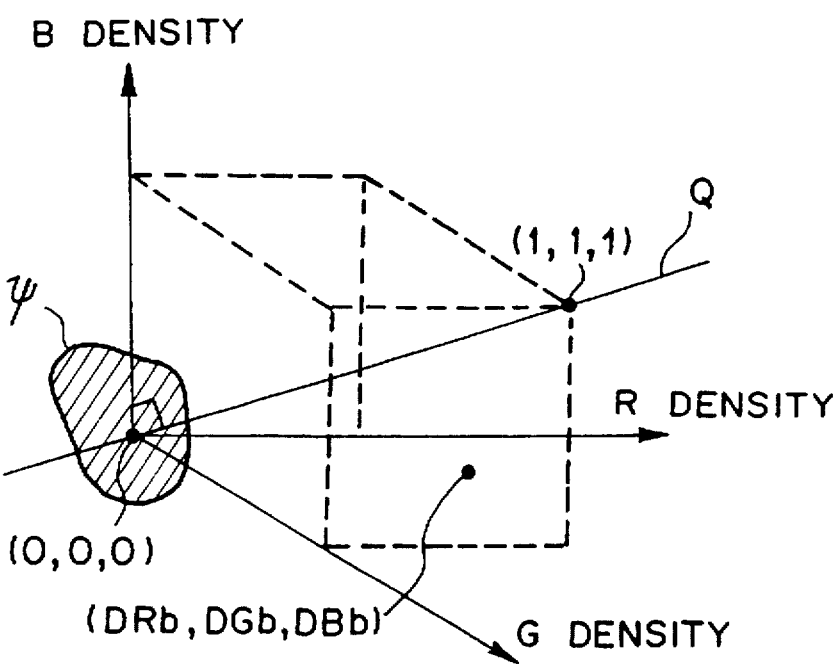

HIGH CHROMA GROUP

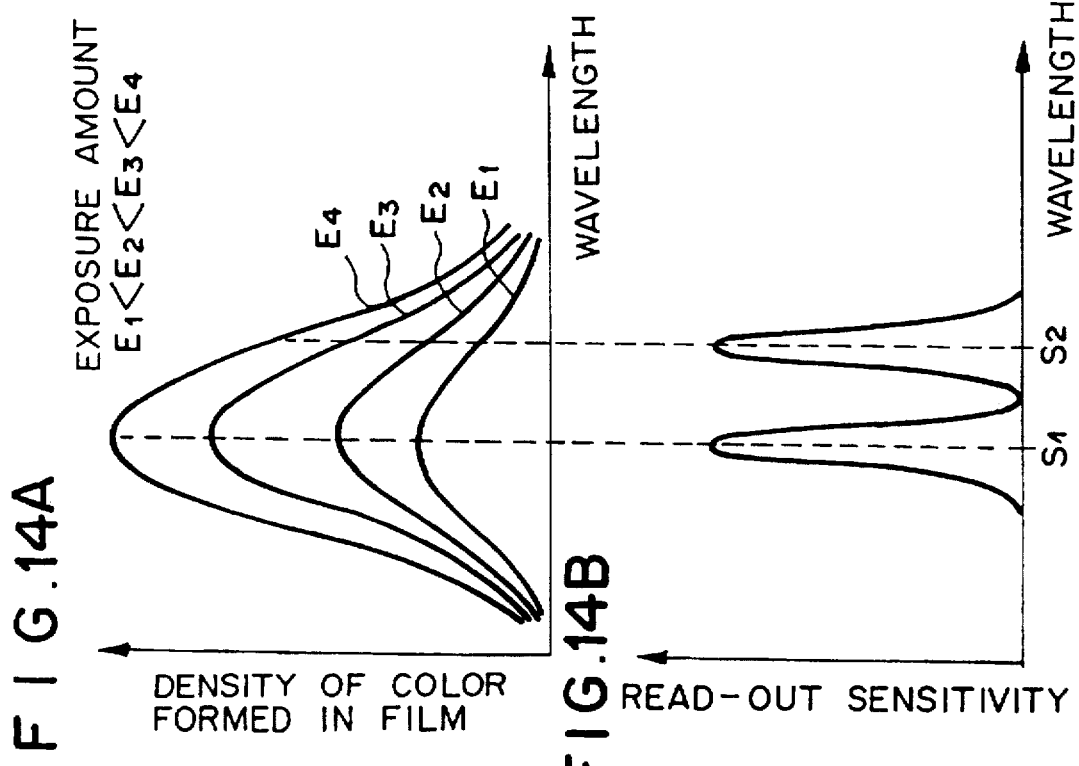

F I G . 28
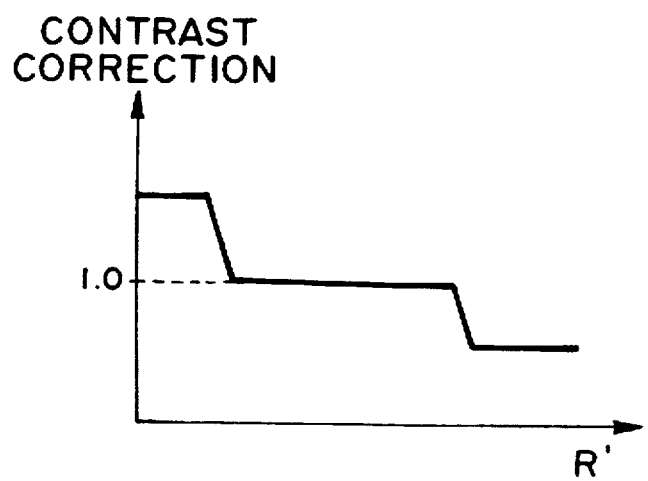

IMAGE PROCESSING METHOD FOR PHOTOGRAPHIC PRINTER

BACKGROUND OF THE INVENTION

1. Field of the Invention

This invention relates to an image processing method for optimally adjusting gray balance, brightness, contrast and chroma of a photographic print in a photographic printer in which a visible image is recorded on a color photosensitive material on the basis of three color image signals obtained by reading out an image recorded on a color film.

2. Description of the Related Art

As disclosed, for instance, in Japanese Unexamined Patent Publication No. 6(1994)-233052, there has been known a photographic printer in which red, green and blue image signals each made up of image signal components representing densities of the color of respective picture elements are obtained by reading out an image recorded on a color photographic film, light beams of three colors are modulated according to the image signals and a color image is recorded on a color photosensitive material by scanning the photosensitive material with the modulated light beams.

In the photographic printer of this type, there has been a problem of disturbance in gray balance. That is, an object which is actually gray (achromatic) is sometimes recorded on the photosensitive material as a tinged image. This is caused by the fact that the red, green and blue densities represented respectively by R-, G- and B-image signal components for a gray object are not equal to each other, though they should be so, for the following reason.

That is, normal negative films are generally exposed by an area exposing system upon printing and in such an area exposing system, the printing densities are controlled by the amount of exposure. Accordingly, the negative film is designed so that cyan, magenta and yellow dyes are developed in densities different from each other by a predetermined value upon exposure to gray light. Accordingly, the R-, G- and B-image signal components for a gray object which are obtained from such a negative film naturally represent different densities.

If the differences in density between the cyan, magenta and yellow dyes can be known, the R-, G- and B-image signal components can be corrected to correct the gray balance. However, the differences in densities in which the cyan, magenta and yellow dyes are developed upon exposure to gray light differ film to film as shown in FIGS. 13A and 13B and vary depending on developing conditions. Further photographic films can be exposed under an improper light source, e.g., a photographic film for daylight is exposed to light from a fluorescent lamp, which results in variation in the differences between the cyan, magenta and yellow dye densities.

Since the differences between the cyan, magenta and yellow dye densities are constant over the entire exposure range as can be seen from FIGS. 13A and 13B, it can be expected that the gray balance can be corrected by measuring the density differences between the cyan, magenta and yellow dyes at a highlight (full white) point or a shadow (full black) point and correcting the R-, G- and B-image signals by biasing them on the basis of the density differences. However generally it is impossible. This will be described with reference to FIGS. 14A to 14D, hereinbelow.

FIG. 14A shows the relation between the wavelength and the color-forming density in cyan, magenta or yellow. In the four curves shown in FIG. 14A, the exposure increases from the lowermost curve to the uppermost curve. When the density of a film is detected by a pair of photodetectors, one having a peak of sensitivity at wavelength S1 and the other having a peak of sensitivity at wavelength S2 as shown in FIG. 14B, the relation between the exposure and detected density differs between the photodetectors as shown in FIG. 14C. Accordingly even if the differences between the cyan, magenta and yellow dye densities are constant over the entire exposure range as can be seen from FIGS. 13A and 13B, the differences between the R-, G- and B-image signal components, that is, the differences between the measured densities, vary depending on exposure as shown in FIG. 14D. Accordingly it is impossible to correct the gray balance over the entire exposure range by measuring the density differences between the cyan, magenta and yellow dyes at a highlight point or a shadow point and correcting the R-, G- and B-image signals by biasing them on the basis of the density differences.

Further depending on the light source used when taking a picture, red light exposure, green light exposure and red light exposure are not always equal to each other, only one or two of the R-, G- and B-image signals can be compressed in its dynamic range when the exposure to light of the corresponding color falls on a "toe portion" or a "shoulder portion" of the color-forming characteristic curve of the film. This is shown in FIG. 15. As shown in FIG. 15, when, for instance, the exposure range $\Delta R$ to red light falls on the toe portion and the exposure range $\Delta G$ to green light falls on the linear portion, the cyan-forming density range $\Delta C$ becomes smaller than the magenta-forming density range $\Delta M$ even if the width of the exposure range $\Delta R$ is equal to that of the exposure range $\Delta G$. This results in difference in the dynamic range, and accordingly, even if the image signals are properly biased, it is impossible to correct the gray balance over the entire exposure range.

Further in such a photographic printer, images are read out from not only properly exposed films but also underexposed or overexposed films and recorded on photosensitive materials. In an improperly exposed film, a photographic image is recorded on the film using up to the toe portion or the shoulder portion of the color-forming characteristic curve of the film and accordingly when an image signal as read out from the film are used to record an image on the photosensitive material, contrast of the recorded image becomes unsatisfactory in a high density region or a low density region.

In order to overcome such a problem, it has been proposed to subject an image signal as read out from an improperly exposed film to a nonlinear conversion processing with characteristics inverse to the characteristics of the film and to record an image on a photosensitive material on the basis of the processed image signal. See, for instance, Japanese National-Publication-of-translated-version No. 4(1992)-504944.

By such a nonlinear conversion processing, a print having an optimal brightness can be obtained from an underexposed or over exposed film without excessively enhancing contrast in an intermediate density region unlike the case where the contrast is enhanced over the entire brightness range.

However when the gradation in the shadow side portion (the low density region) of a print to be printed on the basis of image signals obtained from, for instance, an underexposed film is produced by the nonlinear conversion processing, differences between image signal components DR, DG and DB representing the red, green and blue densities of the gray portion or portion near the gray portion, which are inherently substantially equal to each other, are enlarged and the portion in the finished print which should be gray at a low chroma can be tinged.

In a photographic printer described above, the brightness of a finished print can be easily adjusted by simply carrying out a linear conversion of the image signals. Conventionally, when the brightness of the print is adjusted, a mean density of the image represented by the three color image signals is calculated and the brightness of the print is determined so that the mean density becomes a predetermined printing density (e.g., 0.7 in the optical density).

However when the brightness of a print is determined on the basis of the mean density of the image, there arises a problem that the print cannot be finished in a desirable brightness in the case where the density distribution on the object is statistically inclined or the main object greatly differs from the background in brightness. For example, in the case of an image including therein a large white signboard, the print is finished dark, and in the case of an image where a main object is in counter light, the main object is finished dark.

SUMMARY OF THE INVENTION

In view of the foregoing observations and description, the primary object of the present invention is to provide an image processing method for optimally adjusting gray balance, brightness, contrast and chroma of a photographic print in a photographic printer of the type described above.

In a photographic printer in which red, green and blue light beams are modulated respectively according to red, green and blue image signals DR, DG and DB each made up of image signal components CR, CG and CB representing densities of the corresponding color of respective picture elements obtained by reading out an image recorded on a color photographic film, and a color image is recorded on a color photosensitive material by scanning the photosensitive material with the modulated light beams, the image processing method in accordance with the present invention comprises the steps of carrying out on the red, green and blue image signals DR, DG and DB a calibration processing for substantially equalizing the gray scales for the respective colors, carrying out on the processed red, green and blue image signals DR, DG and DB a gray balance adjustment for adjusting image signal components CR, CG and CB of the red, green and blue image signals DR, DG and DB representing a gray object to represent the same density, carrying out a processing for determining an exposure condition of the color photographic film on the basis of the red, green and blue image signals DR, DG and DB, carrying out on the gray-balance-adjusted red, green and blue image signals DR, DG and DB a processing for compensating for nonlinearity of the exposure-color-forming density characteristics of the color film according to the determined exposure condition of the color film, and carrying out on the thus processed red, green and blue image signals DR, DG and DB a processing for adjusting the brightness of the print according to predetermined characteristics determined on the basis of the scene of photography.

In accordance with this image processing method, since a gray balance adjustment for adjusting image signal components CR, CG and CB of the red, green and blue image signals DR, DG and DB representing a gray (achromatic) object to represent the same density is carried out on the red, green and blue image signals DR, DG and DB, a gray (achromatic) object can be prevented from being tinged in a finished print.

Further since a processing for compensating for nonlinearity of the exposure-color-forming density characteristics of the color film according to the determined exposure condition of the color film is carried out on the red, green and blue image signals DR, DG and DB, the contrast in the brightness range where the contrast is apt to become poor can be improved when an image on an improperly exposed film is printed.

Further since a processing for adjusting the brightness of the print according to predetermined characteristics determined on the basis of the scene of photography is carried out on the red, green and blue image signals DR, DG and DB, the print can be finished in a desirable brightness even in the case where the density distribution on the object is statistically inclined or the main object greatly differs from the background in brightness.

Further by carrying out on the red, green and blue image signals DR, DG and DB a calibration processing for substantially equalizing the gray scales for the respective colors, load in operation in the gray balance adjustment processing and the later processings can be reduced.

The calibration processing may be carried out, for instance, by carrying out a γ-conversion processing on at least one of the red, green and blue image signals DR, DG and DB with conversion characteristics which are fixed for each color so that the differences between the densities represented by the image signal components CR, CG and CB of the red, green and blue image signals DR, DG and DB representing a gray object become constant irrespective of the amount of exposure.

The gray balance adjustment may comprise a step of detecting, on the basis of image signals D1, D2 and D3, which correspond to the red, green and blue image signals DR, DG and DB without limiting to this order, picture elements which are of chroma higher than a predetermined chroma, and excluding the image signal components DC1, DC2 and DC3 for the detected picture elements and picture elements which are adjacent to the detected picture elements and the hue differences from the detected picture elements of which are within a predetermined value, from the image signals D1, D2 and D3, thereby obtaining low chroma image signals D1', D2' and D3' made up of image signal components DC1', DC2' and DC3' for low chroma picture elements, a step of obtaining shadow points D1$s$, D2$s$ and D3$s$ and highlight points D1$h$, D2$h$ and D3$h$ in the low chroma image signals D1', D2' and D3' thereby obtaining dynamic ranges for the respective colors, and correcting the highlight point D1$h$, D2$h$ or D3$h$, when the differences between the dynamic ranges for the respective colors are not within an acceptable value, so that the dynamic ranges for the respective colors are equalized, a step of detecting picture elements which are of the same value in one of the image signal components DC1' and DC2' for low chroma picture elements and averaging the values of the other of the image signal components DC1' and DC2', thereby obtaining sets of image signal component pairs (DC1", DC2"), the image signal component pairs (DC1", DC2") in each set being of the same value in one of the image signal components DC1" and DC2" and of the averaged value in the other of the image signal components DC1" and DC2", a step of detecting picture elements which are of the same value in one of the image signal components DC3' and DC2' and averaging the values of the other of the image signal components DC3' and DC2', thereby obtaining sets of image signal component pairs (DC3", DC2"), the image signal component pairs (DC3", DC2") in each set being of the same value in one of the image signal components DC3" and DC2" and of the averaged value in the other of the image signal components DC3" and DC2", a step of obtaining a relation between the densities of the two colors on the basis of the sets of image signal component pairs (DC1", DC2"), the shadow point (D1s, D2s) and the highlight point (D1h, D2h) and carrying out a linear conversion on at least one of the image signals D1 and D2 on the basis of the relation between the densities of the two colors obtained so that the image signals D1 and D2 are equalized over the entire range, and a step of obtaining a relation between the densities of the two colors on the basis of the sets of image signal component pairs (DC3", DC2"), the shadow point (D3s, D2s) and the highlight point (D3h, D2h) and carrying out a linear conversion on at least one of the image signals D3 and D2 on the basis of the relation between the densities of the two colors obtained so that the image signals D3 and D2 are equalized over the entire range.

This method of adjusting the gray balance is advantageous in that since a linear conversion is carried out on one of the image signals D1 and D2 and on one of the image signals D3 and D2 so that the shadow points D1s, D2s and D3s of the image signals D1, D2 and D3 become equal to each other and the highlight points D1h, D2h and D3h become equal to each other and at the same time since the linear conversion is carried out using also the image signal components DC1', DC2' and DC3' for low chroma picture elements, gray balance adjustment can be carried out even for an image having no highlight scene such as a close-up of still life.

Further since the gray balance is adjusted by linear conversion of the image signals, this method can be effectively applied even in the case where the gray balance cannot be established over the entire exposure range by simply biasing the image signals as described above in conjunction with FIGS. 14 and 15.

Further since the gray balance is not adjusted by use of the image signal components DC1', DC2' and DC3' for low chroma picture elements but by use of sets of image signal component pairs (DC1", DC2"), the image signal component pairs (DC1", DC2") in each set being of the same value in one of the image signal components DC1" and DC2" and of the averaged value in the other of the image signal components DC1" and DC2", and sets of image signal component pairs (DC3", DC2"), the image signal component pairs (DC3", DC2") in each set being of the same value in one of the image signal components DC3" and DC2" and of the averaged value in the other of the image signal components DC3" and DC2", the gray balance can be correctly adjusted even if the distribution of the image signal components DC1', DC2' and DC3' is statistically inclined.

Further since when the image signal components DC1', DC2' and DC3' for low chroma picture elements are obtained, the image signal components DC1, DC2 and DC3 for high chroma picture elements and picture elements which are adjacent to the high chroma picture elements and the hue differences from the high chroma picture elements of which are within a predetermined value are excluded from the image signals D1, D2 and D3 (that is, since the image signal components DC1, DC2 and DC3 for picture elements considered to be of high chroma are excluded on the basis of not only information on the color but also information of the position), only the image signal components DC1', DC2' and DC3' for low chroma picture elements, which are useful in the gray balance adjustment, can be precisely extracted.

Further since the highlight point D1h, D2h or D3h is corrected so that the dynamic ranges for the respective colors are equalized when the differences between the dynamic ranges for the respective colors are not within an acceptable value, a highlight point cannot be detected by mistake in an image actually having no highlight point such as a close-up of still life, whereby failure in gray balance adjustment can be prevented.

When the method of adjusting the gray balance described above is employed, it is preferred that picture elements at a specific first hue are selected from the low chroma picture elements and the image signals D1' and D2' are obtained from the image signal components DC1', DC2' and DC3' for the selected picture elements while picture elements at a specific second hue different from the first hue are selected from the low chroma picture elements and the image signals D3' and D2' are obtained from the image signal components DC1', DC2' and DC3' for the selected picture elements.

This is advantageous in preventing color failure (subject failure due to color of the object).

In this case, it is preferred that when the image signals D1, D2 and D3 respectively represent the red density, the green density and the blue density, picture elements at a hue from blue to yellow are selected as the picture elements at the first hue for obtaining the relation between the green density and the red density and picture elements at a hue from red to cyan are selected as the picture elements at the second hue for obtaining the relation between the green density and the blue density.

When the gray balance adjustment is carried out in the manner described above, the linear conversion of the image signals may be carried out, for instance, in the following manner. That is, when the relation between the densities of the two colors obtained on the basis of the sets of image signal component pairs (DC1", DC2"), the shadow point (D1s, D2s) and the highlight point (D1h, D2h) is given by $Y=\alpha_1 \cdot X + \beta_1$ in a X-Y coordinate system, the image signal D2 is kept unchanged and the image signal D1 is converted to D1c as $D1c=\alpha_1 \cdot D1 + \beta_1$. Similarly when the relation between the densities of the two colors obtained on the basis of the sets of image signal component pairs (DC3", DC2"), the shadow point (D3s, D2s) and the highlight point (D3h, D2h) is given by $Y=\alpha_3 \cdot X + \beta_3$ in a X-Y coordinate system, the image signal D2 is kept unchanged and the image signal D3 is converted to D3c as $D3c=\alpha_3 \cdot D3 + \beta_3$.

The processing for determining an exposure condition of the color photographic film may comprise the steps of creating a histogram of densities represented by image signal components CR, CG and CB of the image signals DR, DG and DB, obtaining the density at a particular point on the histogram and the dynamic ranges of the image signals DR, DG and DB, determining that the photographic film was underexposed when the density of the particular point is smaller than a first predetermined density and at the same time the dynamic ranges of the image signals DR, DG and DB are smaller than a predetermined value, and determining that the photographic film was overexposed when the density of the particular point is larger than a second predetermined density and at the same time the dynamic ranges of the image signals DR, DG and DB are smaller than a predetermined value.

With this processing for determining an exposure condition of the color photographic film, the exposure condition of the film can be accurately determined, whereby the processing for compensating for nonlinearity of the exposure-color-forming density characteristics of the color film, which is carried out on the basis of the result of the determination, can be properly carried out.

That is, when the densities represented by image signal components obtained from an image recorded on a color film are substantially small on the whole, there is a high probability that the color film was underexposed whereas when the densities represented by image signal components obtained from an image recorded on a color film are substantially large on the whole, there is a high probability that the color film was overexposed.

Accordingly it may be basically considered that the color film is underexposed when the density of the particular point is smaller than a first predetermined density which is properly determined and that the color film is overexposed when the density of the particular point is larger than a second predetermined density which is properly determined. However since the density at the particular point varies by the base density of the film, there is a possibility of misjudgment when the exposure condition is determined solely on the basis of the density at the particular point.

On the other hand, when the dynamic range of an image signal obtained from an image recorded on a color film is large to a certain extent, there is a high probability that the color film was properly exposed using only the linear portion of the characteristic curve of the photosensitive material. To the contrast, when the dynamic range is smaller than normal, there is a high probability that the color film was underexposed or overexposed, that is, the photograph was taken using up to a "toe portion" or a "shoulder portion" of the characteristic curve of the film, and accordingly the dynamic range was compressed.

Thus by determining the exposure condition on the basis of both the density at a particular point and the dynamic range of the image signal, underexposure or over exposure can be determined more accurately.

The processing for compensating for nonlinearity of the exposure-color-forming density characteristics of the color film may comprise, for instance,

- a step of converting the image signals DR, DG and DB to signals representing the hue, brightness and chroma of each picture element,
- a step of determining a range of application of the characteristics inverse to the exposure-color-forming characteristics of the film on the basis of the exposure condition of the film determined and carrying out a conversion processing for changing the brightness according to the inverted characteristics on the signal representing the brightness,
- a step of carrying out a conversion processing for changing the chroma on the signal representing the chroma independently from the conversion processing for changing the brightness, and
- a step of converting the processed signals representing the brightness and the chroma and the signal representing the hue to image signals each made up of image signal components representing the red, green or blue densities of picture elements.

In this processing, the image signals DR, DG and DB representing the red, green and blue densities of each picture element are once converted to signals representing the hue, brightness and chroma of each picture element and then the image signals representing the brightness and the chroma are subjected respectively to conversion processings for changing the brightness and the chroma. Accordingly, the brightness and the chroma of the print can be freely adjusted independently from each other.

Accordingly when this processing for compensating for nonlinearity of the exposure-color-forming density characteristics of the color film is employed in the image processing method of the present invention, for instance, when printing an underexposed film, the print can be prevented from being granularly tinged by enhancing the gradation in the low brightness region to improve contrast and decreasing the chroma of low chroma picture elements.

Generally in the case of an overexposed film, the chroma of high chroma picture elements lowers. However when the brightness and the chroma of the print can be adjusted independently from each other as described above, reduction in chroma of the high chroma picture elements due to over exposure can be compensated for by increasing the chroma of the high chroma picture elements while improving the contrast by enhancing the gradation in the high brightness region.

The processing for compensating for nonlinearity of the exposure-color-forming density characteristics of the color film may also comprise

- a step of carrying out first and second nonlinear conversion processings on the image signals DR, DG and DB for changing the brightness represented by the image signals DR, DG and DB in a part of the brightness range, and
- a step of carrying out first and second matrix processings for changing throughout the chroma represented by the image signals DR, DG and DB respectively between the first and second nonlinear conversion processings and after completion of the second nonlinear conversion processing,
- one of the first and second matrix processings being for increasing the chroma and the other for decreasing the chroma,
- the characteristics of the first and second nonlinear conversion processings being determined according to the exposure condition so that the nonlinearity of the exposure-color-forming density characteristics of the color film is compensating for as a result of the two nonlinear conversion processings.

In this processing, since nonlinear conversion processings for changing the brightness represented by the image signals DR, DG and DB in a part of the brightness range are carried out before carrying out first and second matrix processings for changing throughout the chroma represented by the image signals DR, DG and DB, change of the chroma is limited or enhanced in a part of the chroma range due to the nonlinear conversion processings. Accordingly, by combination of the first and second matrix processings and the first and second nonlinear conversion processings, the chroma can be freely adjusted in a desired chroma range and in the intermediate chroma range, the chroma can be kept unchanged by causing increase and decrease of the chroma to compensate for each other.

Further by the first and second nonlinear conversion processings respectively carried out before and after the first matrix processing, the brightness can be freely adjusted in a desired brightness range. Though it is necessary for the conversion characteristics of at least one of the nonlinear conversion processings to include characteristics which limit or enhance change of the chroma in a part of the chroma range as described above, such characteristics can be cancelled by combination of the two nonlinear conversion processings. Accordingly the brightness can be freely adjusted without limited by adjustment of the chroma.

Also with this processing for compensating for nonlinearity of the exposure-color-forming density characteristics of the color film, when printing an image carried by an underexposed or overexposed film, the contrast in a brightness range where the contrast is apt to become poor can be improved while decreasing the chroma of low chroma picture elements and/or increasing the chroma of high chroma picture elements.

It is preferred that the second matrix processing be carried out by use of a matrix inverse to the matrix used in the first matrix processing.

With this arrangement, the effects of the first and second matrix processings can be completely compensated for each other so that the chroma is kept unchanged in a chroma range where the chroma should be kept unchanged.

The processing for adjusting the brightness of the print may be carried out, for instance, by detecting, on the basis of the image signals DR, DG and DB, picture elements which are of brightness not higher than a first predetermined brightness close to the shadow or not lower than a second predetermined brightness close to a highlight and are of chroma not higher than a predetermined chroma, excluding the image signal components CR, CG and CB for the detected picture elements and picture elements which form a continuous region in the image together with the detected picture elements and the color differences from the detected picture elements of which are within a predetermined value from the image signals DR, DG and DB, thereby obtaining image signals DR', DG' and DB', and adjusting the brightness of the photographic print on the basis of the mean of the densities represented by the image signal components CR', CG' and CB' of the image signals DR', DG' and DB'.

The detected picture elements which are of brightness not higher than the first predetermined brightness close to the shadow and are of chroma not higher than the predetermined chroma, and those which form a continuous region in the image together with the detected picture elements and the color differences from the detected picture elements of which are within a predetermined value are picture elements in a background portion of a stroboscopic image taken on the night. Further the detected picture elements which are of brightness not lower than the second predetermined brightness close to a highlight and are of chroma not higher than the predetermined chroma, and those which form a continuous region in the image together with the detected picture elements and the color differences from the detected picture elements of which are within a predetermined value are, for instance, picture elements in a background portion of an image taken in counter light.

Accordingly by excluding the image signal components CR, CG and CB for the detected picture elements and picture elements which form a continuous region in the image together with the detected picture elements and the color differences from the detected picture elements of which are within a predetermined value from the image signals DR, DG and DB, thereby obtaining image signals DR', DG' and DB', and adjusting the brightness of the photographic print on the basis of the mean of the densities represented by the image signal components CR', CG' and CB' of the image signals DR', DG' and DB', the brightness of the photographic print is determined without affected by the background portion, whereby the print can be finished in a desirable brightness.

The brightness of the photographic print may also be adjusted on the basis of the mean of the densities represented by the image signal components CR, CG and CB of the image signals DR, DG and DB calculated in such a manner that the picture elements are divided into a plurality of groups on the basis of the image signals DR, DG and DB so that the picture elements in each group form a continuous region in the image and the color differences among the picture elements in each group are within a predetermined value, and when the number of the picture elements in a group is larger than a predetermined value, weights put on the densities of picture elements in the group to the number by which the number of the picture elements in the group is larger than the predetermined value in calculation of the mean density are reduced.

A group of picture elements which together form a continuous region in the image and the color differences among which are within the predetermined value is for an object which statistically has a large influence on the mean density of the image, e.g., a large sign-board in the scene. When calculating the mean density, the densities for such an object should also be used. However when the object is too large, the value of the mean density is extremely affected by the object and the brightness of the print becomes unsatisfactory.

By reducing the weights put on the densities of picture elements in the group to the number by which the number of the picture elements in the group is larger than the predetermined value, the influence of the large object on the mean density can be reduced, whereby the print can be finished in a desirable brightness.

The brightness of the photographic print may also be adjusted on the basis of the mean of the densities represented by the image signal components CR, CG and CB of the image signals DR, DG and DB calculated in such a manner that a three-dimensional histogram of densities represented by image signal components CR, CG and CB of the image signals DR, DG and DB is created, the number of the picture elements included in respective units which are defined by predetermined widths of the image signals DR, DG and DB in the three-dimensional histogram are obtained, and when the number of the picture elements in a unit is larger than a predetermined value, weights put on the densities of picture elements in the unit to the number by which the number of the picture elements in the unit is larger than the predetermined value in calculation of the mean density are reduced.

The picture elements included in a unit in the three-dimensional histogram (the picture elements the values of the image signal components of which fall within a unit) are approximate to one another in the values of the image signal components CR, CG and CB of the image signals DR, DG and DB. Accordingly, all the picture elements for, for instance, a large sign-board in the scene are basically included in a unit.

By reducing the weights put on the densities of picture elements in the unit to the number by which the number of the picture elements in the unit is larger than the predetermined value, the influence of the large object on the mean density can be reduced, whereby the print can be finished in a desirable brightness as in the method described above.

The brightness of the photographic print may also be adjusted by detecting, on the basis of the image signals DR, DG and DB, picture elements which are of brightness not higher than a first predetermined brightness close to the shadow or not lower than a second predetermined brightness close to a highlight and are of chroma not higher than a predetermined chroma, excluding the image signal components CR, CG and CB for the detected picture elements and picture elements which form a continuous region in the image together with the detected picture elements and the color differences from the detected picture elements of which are within a predetermined value from the image signals DR, DG and DB, thereby obtaining image signals DR', DG' and DB', adjusting the brightness of the photographic print on the basis of the mean of the densities represented by the image signal components CR', CG' and CB' of the image signals DR', DG' and DB' calculated by dividing the picture elements into a plurality of groups on the basis of the image signals DR', DG' and DB' so that the picture elements in each group form a continuous region in the image and the color differences among the picture elements in each group are within a predetermined value, and reducing weights put on the densities of picture elements in a group, which includes picture elements larger than a predetermined value in number, to the number by which the number of the picture elements in the group is larger than the predetermined value.

This method is a combination of the methods described above, and accordingly, with this method, both the effects of the methods can be obtained. That is, even a stroboscopic image taken on the night, an image taken in counter light and an image having a large object such as a sign-board can all be printed in a desirable brightness.

The brightness of the photographic print may also be adjusted by detecting, on the basis of the image signals DR, DG and DB, picture elements which are of brightness not higher than a first predetermined brightness close to the shadow or not lower than a second predetermined brightness close to a highlight and are of chroma not higher than a predetermined chroma, excluding the image signal components CR, CG and CB for the detected picture elements and picture elements which form a continuous region in the image together with the detected picture elements and the color differences from the detected picture elements of which are within a predetermined value from the image signals DR, DG and DB, thereby obtaining image signals DR', DG' and DB', adjusting the brightness of the photographic print on the basis of the mean of the densities represented by the image signal components CR', CG' and CB' of the image signals DR', DG' and DB' calculated by creating a three-dimensional histogram of densities represented by image signal components CR', CG' and CB' of the image signals DR', DG' and DB', obtaining the number of the picture elements included in respective units which are defined by predetermined widths of the image signals DR', DG' and DB' in the three-dimensional histogram, and by reducing weights put on the densities of picture elements in a unit, which includes picture elements larger than a predetermined value in number, to the number by which the number of the picture elements in the unit is larger than the predetermined value.

This method is another combination of the methods described above, and accordingly, with this method, both the effects of the methods can be obtained. That is, even a stroboscopic image taken on the night, an image taken in counter light and an image having a large object such as a sign-board can all be printed in a desirable brightness.

It is preferred that the red, green and blue image signals DR, DG and DB which have been subjected to the processing for compensating for nonlinearity of the exposure-color-forming density characteristics of the color film be further subjected to a processing for adjusting the contrast of the print according to predetermined characteristics determined on the basis of the scene of photography.

BRIEF DESCRIPTION OF THE DRAWINGS

FIG. 2 is a flow chart for illustrating the gray balance adjustment carried out in the photographic printer, FIG. 4 is a graph for illustrating a histogram of densities represented by image signal components created in the gray balance adjustment processing, FIG. 5 is a view for illustrating a color difference space employed in the gray balance adjustment processing, FIGS. 14A to 14D are views for illustrating why the gray balance adjustment is necessary, FIG. 28 is a graph showing an example of the contrast correction characteristics employed in the contrast adjustment processing which can be carried out together with the image processing method in accordance with the present invention.

DESCRIPTION OF THE PREFERRED EMBODIMENT

Figure 1:
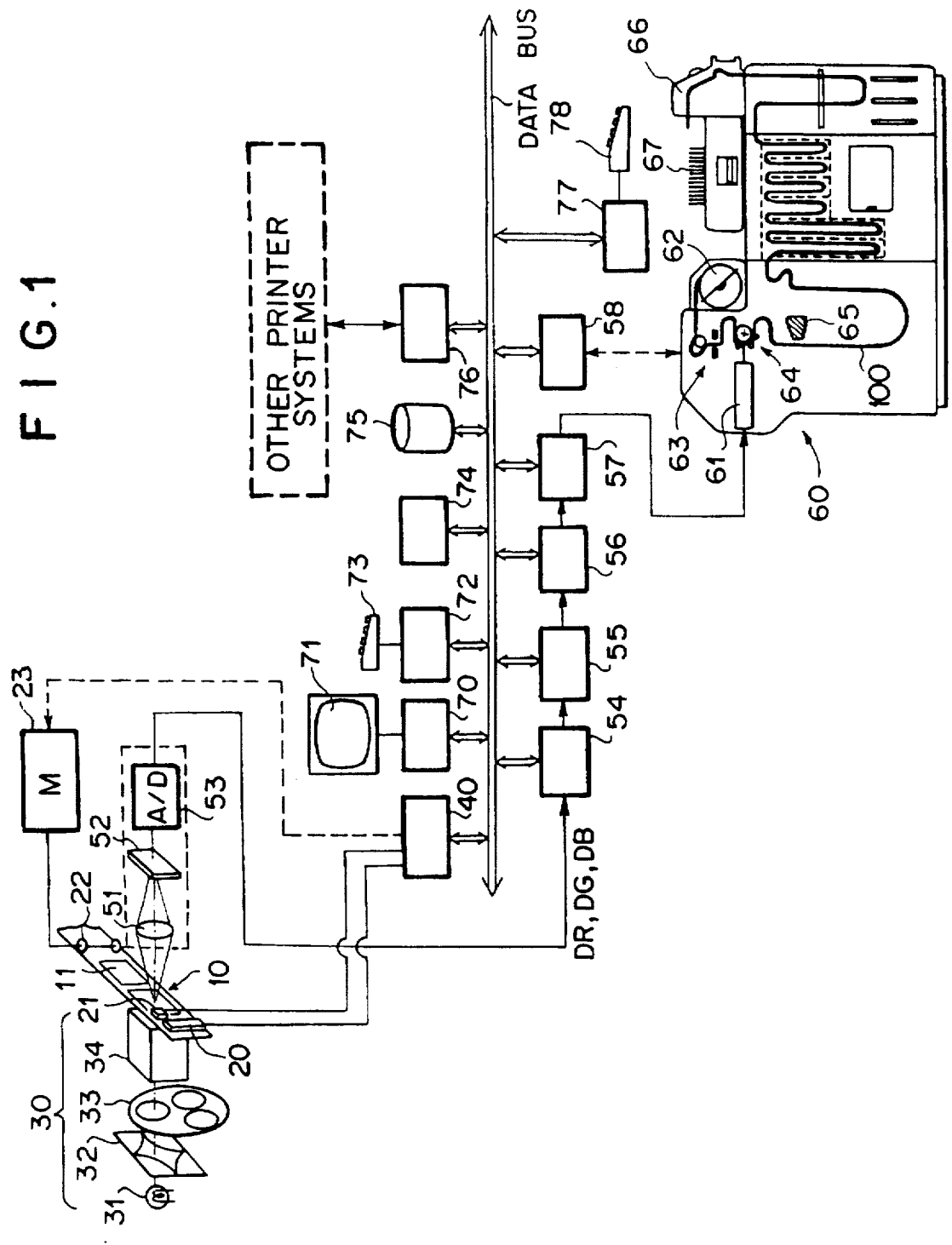
FIG. 1 is a schematic view of an example of a digital photographic printer for carrying out the method of the present invention.

In FIG. 1, a digital photographic printer is provided with a scanner 20 which reads out a film number recorded on a check tape applied to an end portion of color film 10, a bar code reader 21 which reads out a bar code for each of the exposures (frames) 11 of the film 10, a sprocket 22 which is in mesh with perforations of the film 10 and is rotated to feed the film 10, a motor 23 which drives the sprocket 22, and a film scanner control interface 40 which sends the film number read by the scanner 20 and the exposure number read by the bar code reader 21 to a data bus and outputs a motor control signal to the motor 23.

The photographic printer is further provided with a light source unit 30 which comprises a light source 31 which emits white light, a light control unit 32, a color separation unit 33 and a diffusion box 34 and projects reading light onto the exposures 11 of the film 10, a CCD 52 which photoelectrically reads an image (transmission image) recorded on the exposure 11, onto which the reading Alight is projected, through a lens 51, an A/D convertor 53 which converts an image signal output from the CCD 52 to a digital image signal, a first image processing system 54 which carries out an image processing on a digital image signal output from the A/D convertor 53 and outputs a processed image signal to a frame memory 55, a second image processing system 56 which carries out, as needed, an image processing with a changed image processing parameter on the processed digital image signal stored in the frame memory 55, and a modulator driver 57 which outputs a modulation signal on the basis of the processed digital image signal.

The photographic printer is further provided with a printer 60 which reproduces a visible image based on the modulation signal output from the modulator driver 57, a printer interface 58, a hard disk 75 which stores the digital image signal stored in the frame memory 55 by way of the data bus, a CRT monitor 71 which reproduces, as needed, a visible image based on the digital image signal and displays image processing conditions and the like, a display interface 70, a keyboard 73 for inputting image processing conditions, corrections values for the image processing conditions, an image retrieval information and the like, a keyboard interface 72, a CPU (central processing unit) 74, a communication port 76 which is connected to other digital photographic printer systems through a communication line, a keyboard 78 which is disposed in a check section for checking photographic prints reproduced by the printer 60 and is for inputting, as needed, a reprint instruction and a keyboard interface 77. The CPU 74 carries out mapping of the image retrieval information including the film number and the exposure numbers respectively read by the scanner 20 and the bar code reader 21, the image processing conditions input from the first image processing system 54 and the digital image signal input from the frame memory 55 and then stores them in the hard disk 75. Further the CPU 74 retrieves a digital image signal corresponding to image retrieval information input from the keyboard 73 and controls it, and controls the instruments connected to the data bus.

The printer 60 comprises a printing section, a developing section and a drying section. The printing section comprises a magazine 62 which stores a roll of photographic paper 90 in a continuous length, an exposing light scanner 61 which modulates exposing light according to the modulation signal output from the modulator driver 57 and causing the modulated exposing light to scan the photographic paper 90 in a direction perpendicular to the longitudinal direction of the photographic paper 90 (main scanning), a hole punch unit 63 which punches out reference holes in the photographic paper 90 for positioning the photographic paper 90, a sub-scanning drive system 64 which feeds the photographic paper 90 in the longitudinal direction thereof (sub-scanning) on the basis of the reference holes, and a back printing unit 65 which records the image retrieval information input through the printer control interface 58 on the back side of the photographic paper 90.

The drying section comprises a cutter 66 which cuts the exposed photographic paper 90 exposure by exposure after drying and a sorter 67 which arranges in order the prints thus cut from the exposed photographic paper 90 in a continuous length as well as a normal drying means.

Operation of the digital photographic paper will be described, hereinbelow. The CPU 74 first drives the motor 23 by way of the film scanner control interface 40, thereby feeding the film 10 by way of the sprocket 22. While the film 10 is fed, the film number on the check tape is read by the scanner 20 and input into the CPU 74 and the bar codes representing the number of the exposures 11 are read by the bar code reader 21 and input into the CPU 74 through the film scanner control interface 40.

The exposure 11 whose exposure number represented by the bar code has been read is exposed to light from the light source unit 30 and the image on the exposure 11 is focused on the CCD 52 through the lens 51. The CCD 52 reads the image and the output signal of the CCD 52 is digitized by the A/D convertor 53, whereby a digital image signal made up of digital image signal components for the respective picture elements is obtained.

At this time, red, green and blue filters of the color separation unit 33 are inserted in sequence into the optical path of the light from the light source 31 and the CCD 52 reads the images for the respective filters. Accordingly, three digital image signals DR, DG and DB made up of digital image signal components respectively representing the red, green and blue densities at the respective picture elements are obtained from the A/D convertor 53.

The first image processing system 54 carries out an inversion processing on the digital image signals DR, DG and DB input when they are obtained from a negative and then carries out, on the image signals, an image processing according to a predetermined image processing algorithm so that when a visible image is reproduced on a photographic paper by use of the processed image signals DR, DG and DB, optimal density, gradation and sharpness can be obtained. Then the first image processing system 54 outputs the processed image signals to the frame memory 55.

Strictly speaking, the aforesaid image processings are not carried out directly on the digital image signals DR, DG and DB but on the digital image signals DR, DG and DB after subjected to a gray balance adjustment processing, which will be described later.

The image signals input into the frame memory 55 are once stored therein and at the same time are input into the CPU 74 through the data bus, which enables the CPU 74 to optimally adjust the dynamic range of the CCD 52 and the like and optimally adjust the amount of light projected onto the film from the light source unit 30 on the basis of the image signals so that the image read out is optimal in density and gradation.

The image signals stored in the frame memory 55 is input into the CRT monitor 71 through the data bus and a visible image is displayed on the CRT monitor 71 on the basis of the image signals. Then the operator can input through the keyboard 73 correction values for correcting the image processing conditions so that a visible image optimal in density, gradation, color and sharpness can be obtained.

The correction values input through the keyboard 73 are input into the second image processing system 56. The second image processing system 56 carries out an image processing according to the correction values on the image signals stored in the frame memory 55 and outputs the processed image signals to the modulator driver 57. When the correction is not necessary, the second image processing system 56 outputs the image signals stored in the frame memory as they are to the modulator driver 57.

The printer 60 is controlled by the CPU 74 through the printer control interface 58. That is, the sub-scanning drive system 64 first feeds the photographic paper 90, extending along a predetermined path from the magazine 62, in the sub-scanning direction. The hole punch unit 63 provided on the path of the photographic paper 90 punches out reference holes for synchronization in a side edge portion of the photographic paper 90 at intervals corresponding to, for instance, a length of one photographic print. In the printer 60, the photographic paper 90 is fed with the reference holes used as a reference of synchronization.

The photographic paper is scanned by light beams of three colors emitted from the exposing scanner 61 and modulated according to the image signals while being fed in the sub-scanning direction, whereby a visible image is recorded on the photographic paper 90 according to the image signals. The speed at which the photographic paper 90 is fed is controlled by the CPU 74 so that the main scanning and the sub-scanning are synchronized with each other.

Thereafter the photographic paper 90 is fed to the developing section from the printing section along a predetermined path. After developed and washed in the developing section, the photographic paper 90 is fed to the drying section. In the drying section, the photographic paper 90 is dried and cut into prints by the cutter 66.

The first image processing system 54 carries out a gray balance adjustment processing on the digital image signals DR, DG and DB so that their image signal components CR, CG and CB for a gray object come to represent the same density. The gray balance adjustment processing will be described with reference to FIG. 2, hereinbelow.

Figure 3A:
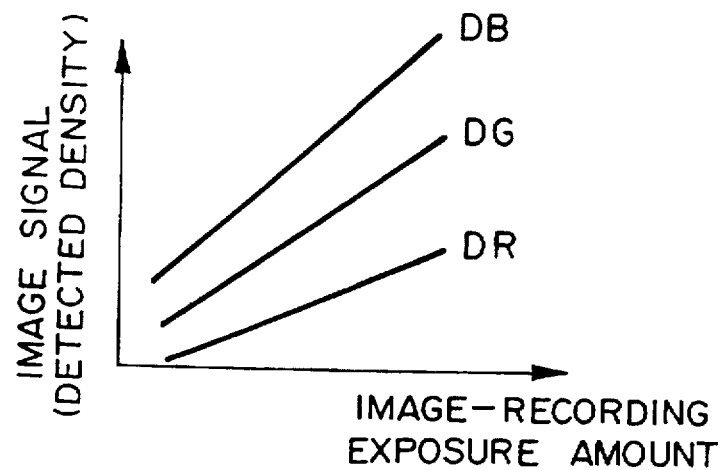
FIGS. 3A and 3B are graphs for illustrating the calibration processing carried out in the method of the present invention.
Figure 3B:
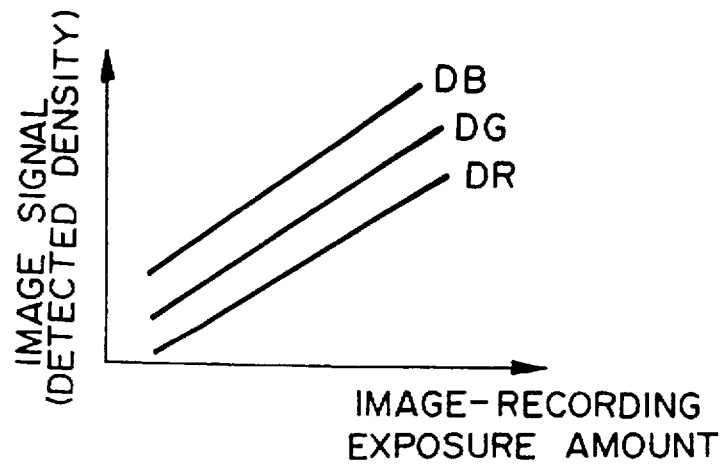

A γ-conversion processing is first carried out on the image signals DR, DG and DB on the basis of respective inherent look-up tables. (step P1) The differences between the densities represented by the image signals DR, DG and DB vary with the amount of exposure as shown in FIG. 3A. The γ-conversion processing is for converting the image signals DR, DG and DB according to characteristics inherent to the respective image signals DR, DG and DB so that the differences between the densities represented by the image signals DR, DG and DB become constant irrespective of the exposure as shown in FIG. 3B. The same look-up tables are used irrespective of the kind of film.

By the γ-conversion processing, the gray scales for the respective colors are substantially equalized, whereby load on operation in the subsequent processings can be reduced.

The γ-converted image signals DRa, DGa and DBa naturally include image signal components for picture elements at high chroma. Accordingly in order to carry out the gray balance adjustment processing, the image signal components for such high chroma picture elements should be excluded from the image signals DRa, DGa and DBa and the resulting image signal components should be used. In order to specify the high chroma picture elements, the characteristic values (brightness, hue and chroma) of each picture element are obtained. For this purpose, the image signals DRa, DGa and DBa are standardized.

In this standardization, histograms of the image signal components of the respective image signals DRa, DGa and DBa are first created, and the maximum value and the minimum value in each of the histograms are obtained. (step P2) An example of the histogram, the maximum value and the minimum value is shown in FIG. 4.

Then the image signals DRa, DGa and DBa are standardized on the basis of the corresponding maximum value and the minimum value. (step P3) For example, standardized image signal component=100×(image signal component−minimum value)÷(maximum value−minimum value).

By thus standardizing the image signals DRa, DGa and DBa, standardized image signals DRb, DGb and DBc are obtained. Then the characteristic values (brightness, hue and chroma) represented by the standardized image signals DRb, DGb and DBb are obtained for all the picture elements. (step P4) The brightness of each picture element is obtained as brightness=(DRb+DGb+DBb)/3.

Figure 6:
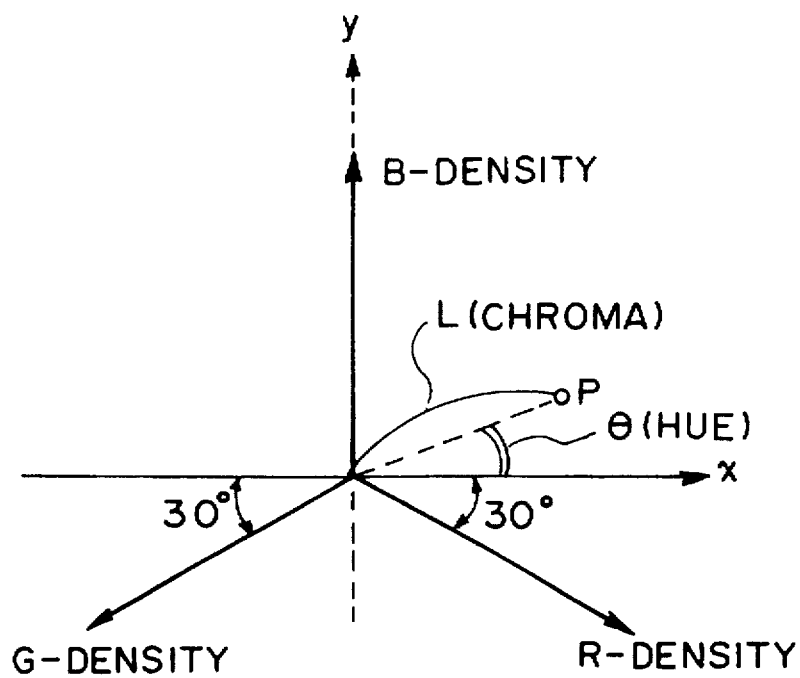
FIG. 6 is a view for illustrating color information in the color difference space.

The hue and chroma are defined in the following manner. Considering a RGB density space shown in FIG. 5, all the density points represented by (DRb,DGb,DBb) in the RGB density space are mapped onto a plane ψ. The plane ψ is a plane defined by R+G+B=0, that is, the plane which is normal to straight line Q and includes the origin (0,0,0). An x-y coordinate system such as shown in FIG. 6 is set on the color difference plane ψ thus defined, and when the mapping of the density point represented by the image signal components for a given picture element is P, the hue for the picture element is defined by the angle θ which the straight line passing through the point P and the origin makes to x-axis and the chroma for the picture element is defined by the distance L of the point P from the origin.

Practically it is preferred that a table in which the values of angle θ and the distance L are related to various combinations of image signal components of the image signals DRb, DGb and DBb be prepared in advance and the values of angle θ and the distance L be obtained on the basis of the values of image signal components of the image signals DRb, DGb and DBb referring to the table.

After the characteristic values (brightness, hue and chroma) represented by the image signals DRb, DGb and DBb are obtained for all the picture elements in this manner, high chroma picture elements which are higher than a predetermined value in chroma are specified. For this purpose, the picture elements forming the scene are selected one by one in sequence along a path the same as the path of raster scan and the chroma of each picture element is compared with a predetermined threshold value. A picture element whose chroma is not lower than the predetermined threshold value is adopted as a reference picture element for high chroma picture elements. Then the hue, and the position of the reference picture element are stored in a memory. (step P5)

Figure 7:
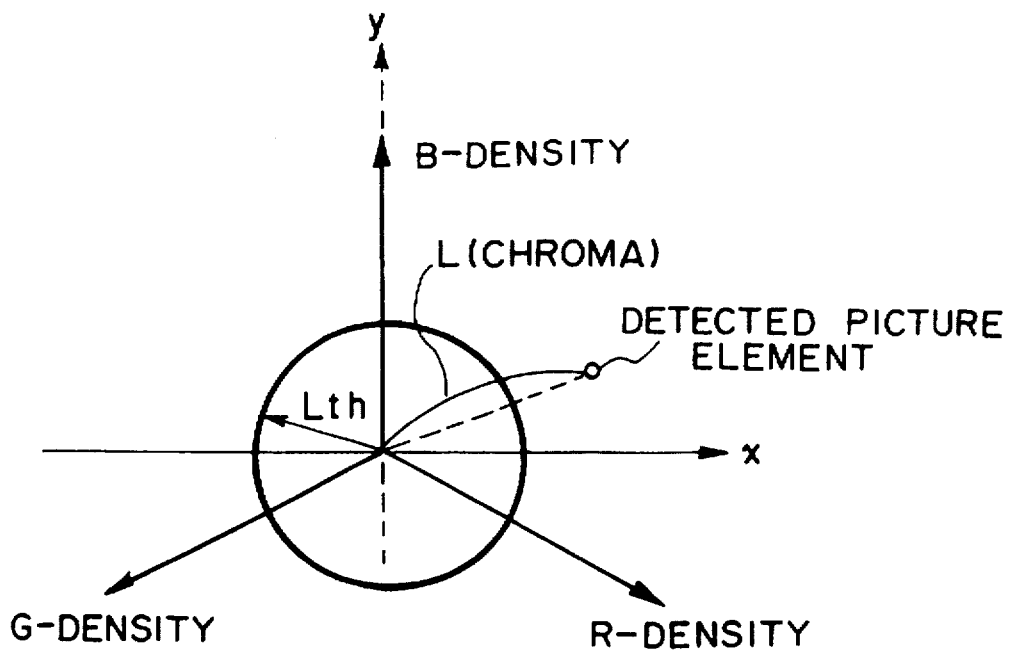
FIG. 7 is a view for illustrating a method of specifying the high chroma picture elements in the gray balance adjustment processing.

When the processing of detecting the reference picture element is explained with reference to the color difference plane like that shown in FIG. 6, this processing is a process for detecting a picture element which is on or outside a circle having a center on the origin of an x-y coordinate system and a radius equal to the threshold value Lth of the chroma as shown in FIG. 7.

Then taking into account the position of each picture element on the scene, high chroma picture elements are grouped. (step P6) For this purpose, the color information (hue and chroma) on the eight picture elements adjacent to the reference picture element (horizontally, vertically and obliquely adjacent to the reference picture element) is checked. When the differences in hue and chroma from the reference picture element are both within acceptable ranges, the picture element is considered to belong to the same high chroma picture element group as the reference picture element and the position of the picture element is stored in the memory. The brightness of the picture element may be taken into account in addition to the hue and the chroma. That is, the picture element may be considered to belong to the same high chroma picture element group as the reference picture element when the difference in hue, chroma and brightness from the reference picture element are all within acceptable ranges.

Then the hue and the chroma of the eight picture elements adjacent to the newly adopted reference picture element are checked. When the differences in hue and chroma from the newly adopted reference picture element are both within the acceptable ranges, the picture element is considered to belong to the same high chroma picture element group as the reference picture element and the position of the picture element is stored in the memory.

The processing is repeated until there remains no adjacent picture element whose differences in hue and chroma from the reference picture element are both within the acceptable ranges.

Figure 8:
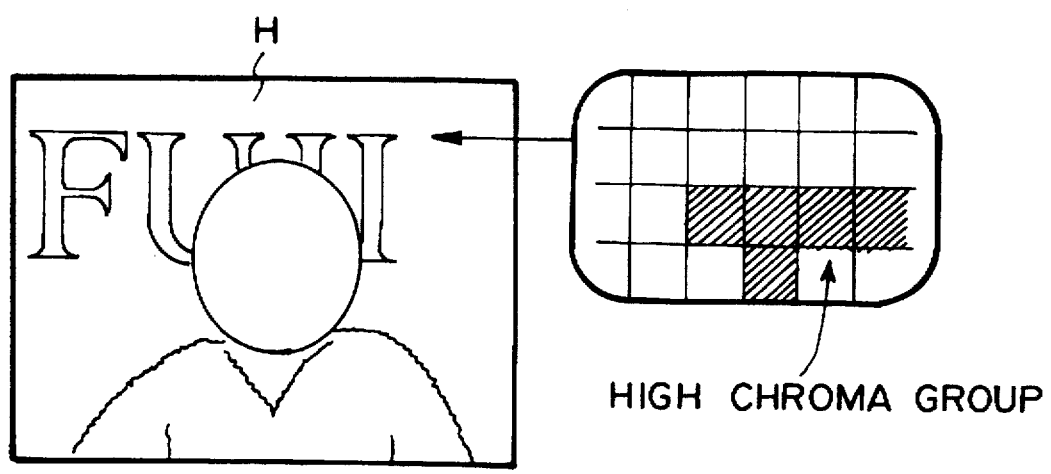
FIG. 8 is a view for illustrating grouping of the high chroma picture elements in the gray balance adjustment processing.

By the processing described above, a group of high chroma picture elements forming a continuous region in the scene H is detected as shown in FIG. 8. Then in a part of the scene H away from the high chroma picture element group, the same procedure is effected to detect another group of high chroma picture elements forming a continuous region.

By carrying out the procedure over the entire area of the scene, generally some high chroma picture element groups are obtained. As described above, the positions of the high chroma picture elements are stored in the memory. Then the image signal components for the high chroma picture elements are excluded from the standardized image signals DRb, DGb and DBb, thereby obtaining image signals DR', DG' and DB' for low chroma picture elements. (step P7)

Conventionally, the image signal of the low chroma picture elements is obtained by simply comparing the chroma of each picture element with the threshold value Lth and without taking into account the position of the picture element. However, for instance, in the case of a scene where brilliant red cloth occupies a major part, red image signal components frequently distribute continuously from low to high chroma, and the picture elements corresponding to the red cloth cannot be all excluded by simply comparing the chroma of each picture element with the threshold value Lth. As a result, an inclination remains in the image signals for the low chroma picture elements.

To the contrast, in accordance with this gray balance adjustment processing, since when the image signal components DR', DG' and DB' for low chroma picture elements are obtained, the image signal components for high chroma picture elements and picture elements which are adjacent to the high chroma picture elements and the hue differences from the high chroma picture elements of which are within a predetermined value are excluded from the image signals DRb, DGb and DBb (that is, since the image signal components for picture elements considered to be of high chroma are excluded on the basis of not only information on the color but also information of the position), only the image signal components for low chroma picture elements, which are useful in the gray balance adjustment, can be precisely extracted even if the standardization of the image signals is somewhat improper, which results in a correct gray balance adjustment processing.

Then histograms of the image signal components of the image signals DR', DG' and DB' are created, and the points at which the image signal components (densities) are minimized and maximized in each histogram are detected as a shadow point and a highlight point. (step P8) Since the image signals DR, DG and DB are obtained from a negative film in this particular embodiment, a point at which the density is minimized is a shadow point and a point at which the density is maximized is a highlight point. The shadow points for the image signals DR', DG' and DB' will be respectively represented by DRs, DGs and DBs and the highlight points for the image signals DR', DG' and DB' will be respectively represented by DRh, DGh and DBh, hereinbelow.

Then the dynamic ranges for the respective colors IR (=DRh-DRs), IG (=DGh-DGs) and IB (=DBh-DBs) are obtained and the differences between those dynamic ranges IR-IGm, IG-IB and IB-IR are calculated. (step P9) When the absolute values of the dynamic range differences IR-IGm, IG-IB and IB-IR exceed a predetermined acceptable value, the highlight point DRh, DGh or DBh is corrected so that the dynamic ranges IR, IG and IB become equal to each other. (step P10)

The reason why the highlight point is corrected is that there are few photographic images having no shadow point whereas there are many photographic images having no highlight point and accordingly, it is considered that the dynamic range takes an abnormal value when a highlight is detected by accident.

Figure 9:
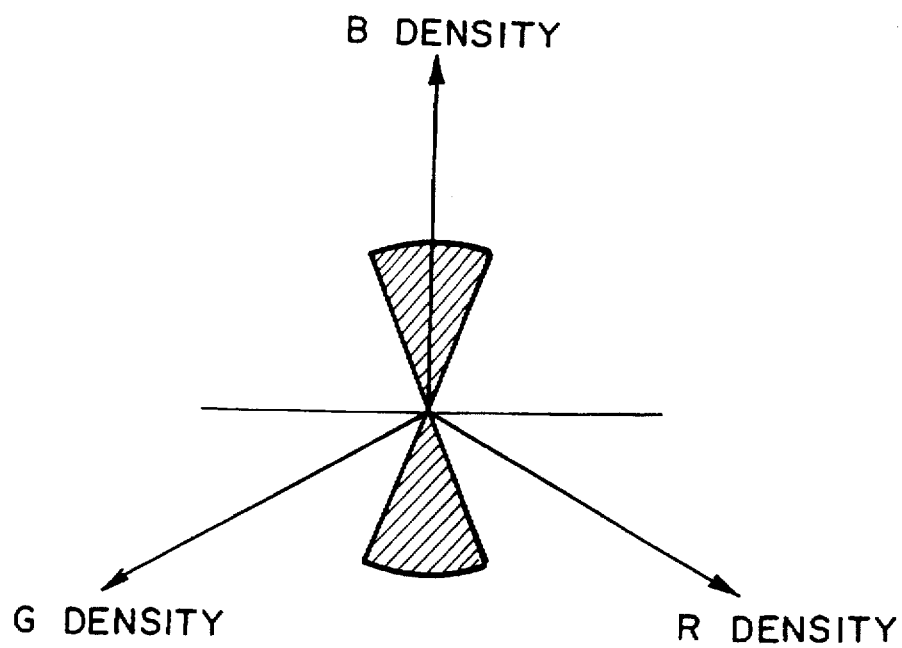
FIG. 9 is a view for illustrating selection of picture elements at a specific hue in the gray balance adjustment processing.
Figure 10:
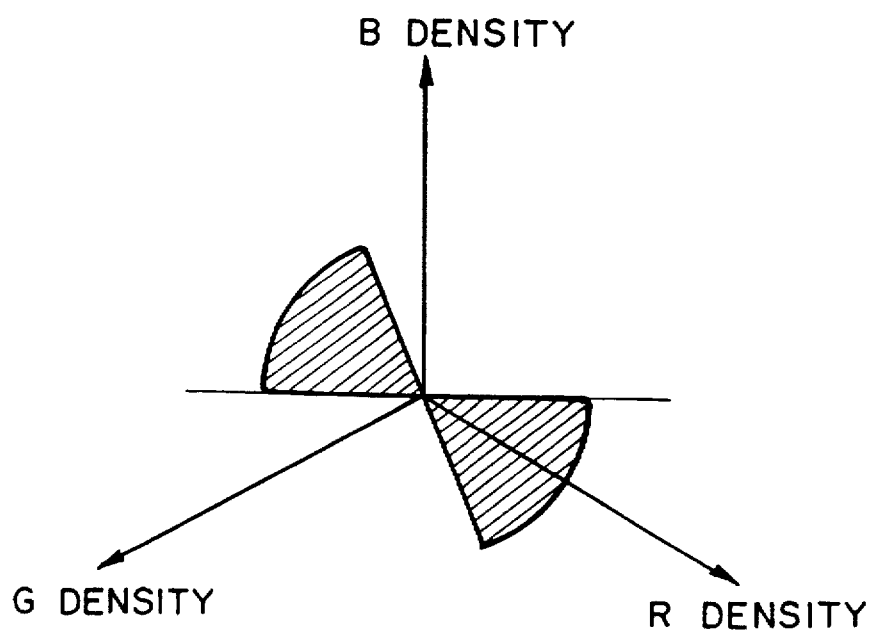
FIG. 10 is a view for illustrating selection of picture elements at a specific hue in the gray balance adjustment processing.

Then picture elements in particular B-Y hue (hatched portion in FIG. 9) are selected from the low chroma picture elements and image signal component pairs (CR', CG') representing the red density and the green density of the selected picture elements are extracted from the image signal components CR', CG' and CB' for the selected picture elements. Further picture elements in particular R-C hue (hatched portion in FIG. 10) are selected from the low chroma picture elements and image signal component pairs (CB', CG') representing the blue density and the green density of the selected picture elements are extracted from the image signal components CR', CG' and CB' for the selected picture elements. (step P11)

The image signal component pairs (CR', CG') are obtained to the number of the picture elements in B-Y hue. Then the image signal component pairs (CR', CG') which are of the same value in the value of CG' are collected and the values of CR' of such image signal component pairs (CR', CG') are averaged. Then the values of CR' of such image signal component pairs (CR', CG') are replaced by the average value. The image signal component pairs having thus replaced CR' will be denoted by (CR", CG"), hereinbelow. Similarly the image signal component pairs (CB', CG') are obtained to the number of the picture elements in R-C hue. Then the image signal component pairs (CB', CG') which are of the same value in the value of CG' are collected and the values of CB' of such image signal component pairs (CB', CG') are averaged. Then the values of CB' of such image signal component pairs (CB', CG') are replaced by the average value. The image signal component pairs having thus replaced CB' will be denoted by (CB", CG"), hereinbelow. (step P12)

Figure 11:
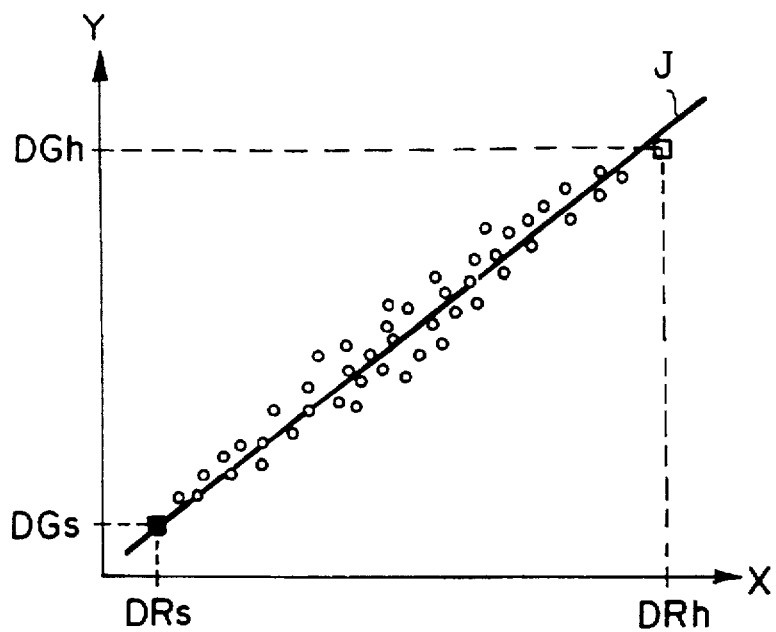
FIG. 11 is a view for illustrating the method of obtaining the relation between the densities of two colors.

Then the sets of image signal component pairs (CR", CG"), the shadow point DRs and the highlight point DRh for the image signal DR', and the shadow point DGs and the highlight point DGh for the image signal DG' are plotted on an X-Y coordinate system such as shown in FIG. 11, and the relation between the densities of red and green is obtained. (step P13) In FIG. 11, small circles indicate the sets of image signal component pairs (CR", CG").

Figure 12:
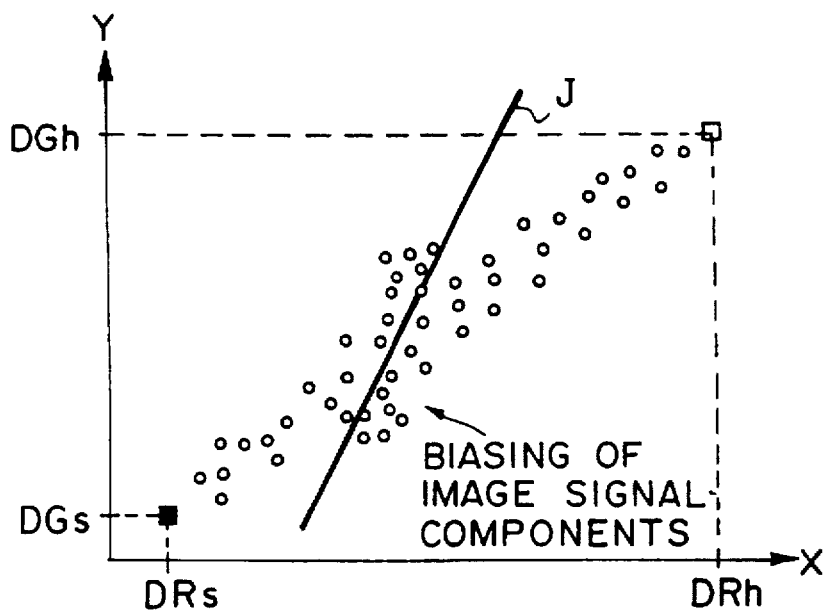
FIG. 12 is a view for illustrating an example where the relation between the densities of two colors is obtained improperly.
Figure 13A:
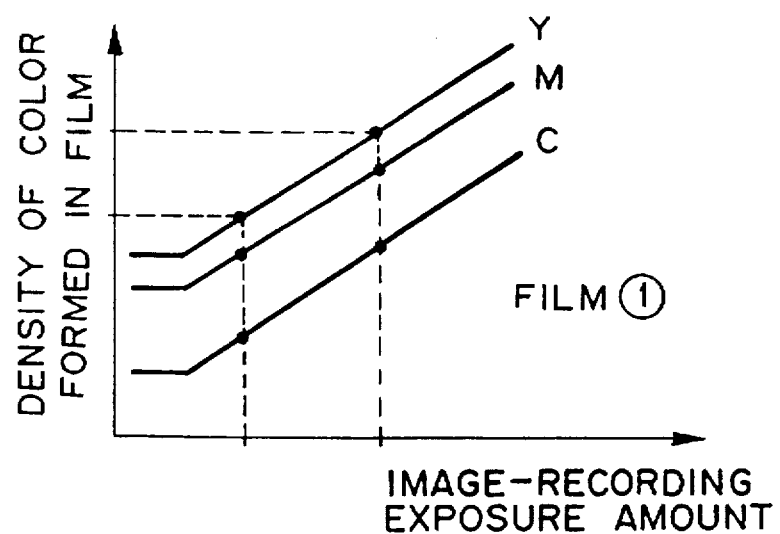
FIGS. 13A and 13B are graphs showing the relations between the exposure of photographic film and the color-forming density.
Figure 13B:
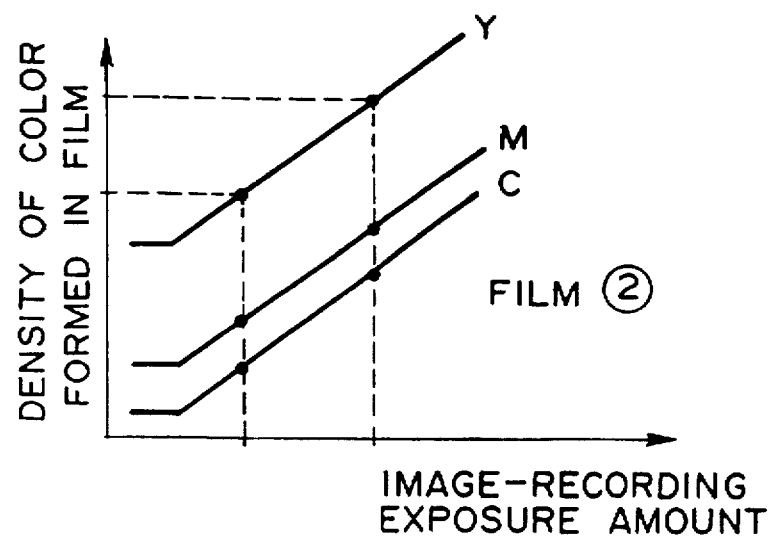

The relation between the red density and the green density can be obtained by a known method, e.g., by obtaining a regression line by least squares method. If replacement by the average value described above is not effected, an improper relation between the red density and the green density can be obtained due to inclination of the image signal components as shown in FIG. 12.

When the relation between the red and green densities is given by $Y=\alpha_1 \cdot X+\beta_1$ in the X-Y coordinate system, the first image processing system 54 keeps the original image signal DG unchanged and linearly converts the original image signal DR to DRc as $DRc=\alpha_1 \cdot DR+\beta_1$. (step P14) By this processing, the image signal components of the original image signal DG represent the same densities as the image signal components of the linearly-converted-image signal DRc for the picture elements of a gray object.

Then the relation between the densities of blue and green is obtained on the basis of the sets of image signal component pairs (CB", CG"), the shadow point DBs and the highlight point DBh for the image signal DB', and the shadow point DGs and the highlight point DGh for the image signal DG' in the manner similar to that described above.

When the relation between the blue and green densities is given by $Y=\alpha_3 \cdot X+\beta_3$ in the X-Y coordinate system, the first image processing system 54 keeps the original image signal DG unchanged and linearly converts the original image signal DB to DBc as $DBc=\alpha_3 \cdot DB+\beta_3$. By this processing, the image signal components of the original image signal DG represent the same densities as the image signal components of the linearly-converted-image signal DBc for the picture elements of a gray object.

Though the green image signal DG is unchanged in the above example, the green image signal DG may be linearly converted as well as the red and blue image signals DR and DB so that the image signal components of the converted image signals DRc, DGc and DBc represent the same densities for the picture elements of a gray object. However, it is preferred that the green image signal DG be used as a reference and kept unchanged from the viewpoint of simplification of the processing.

Figure 15:
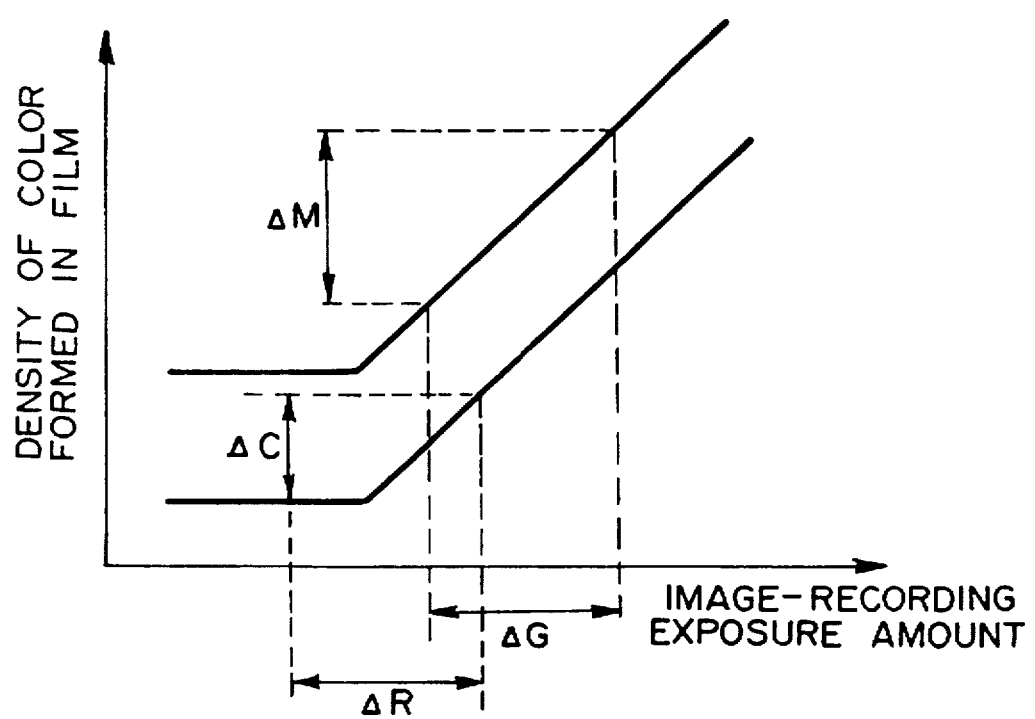
FIG. 15 is a view for illustrating why the gray balance adjustment is necessary.

In the gray balance adjustment processing described above, since the gray balance is adjusted by linear conversion of the image signals DR and DB, the processing can be effectively applied even in the case where the gray balance cannot be established over the entire exposure range by simply biasing the image signals as described above in conjunction with FIGS. 14 and 15.

Further in the gray balance adjustment processing described above, since the relation between the red and green densities is obtained on the basis of only the picture elements in B-Y hue with the picture elements in R-C hue and G-M hue, which are apt to involve color failure, excluded, and since the relation between the blue and green densities is obtained on the basis of only the picture elements in R-C hue with the picture elements in B-Y hue and G-M hue, which are apt to involve color failure, excluded, color failure can be certainly prevented.

Figure 16:
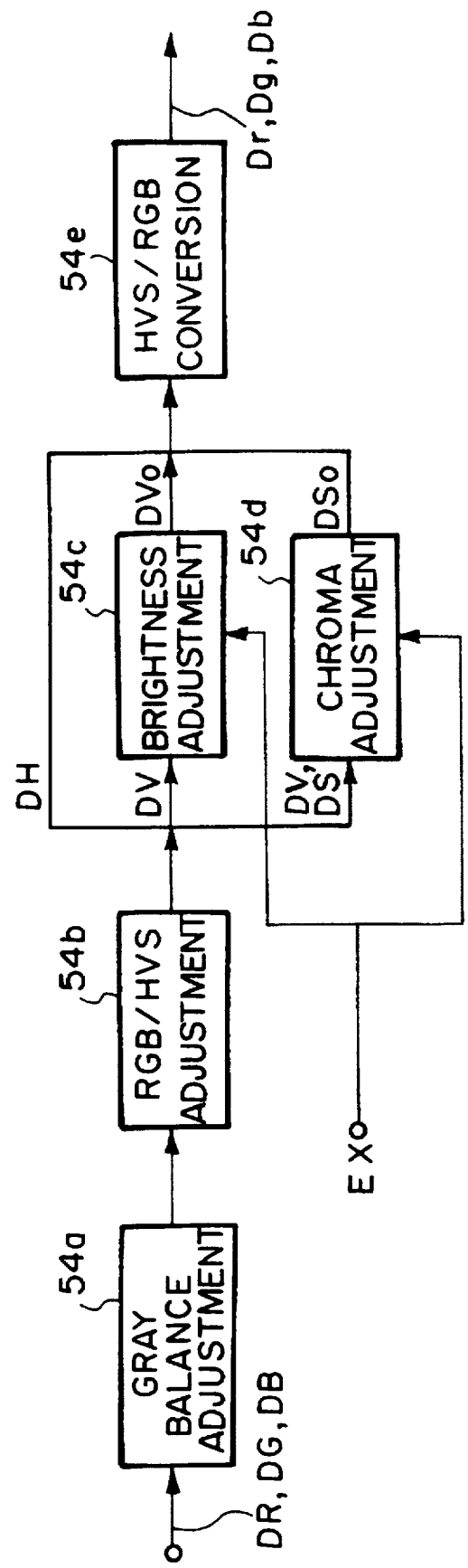
FIG. 16 is a block diagram showing an example of the system concerned to adjustment of the brightness and chroma of a print.

Thereafter the first image processing system 54 carries out a processing for compensating for nonlinearity of the exposure-color-forming density characteristics of the color film on the image signals DRc, DGc and DBc which have been subjected to the gray balance adjustment processing. FIG. 16 shows a part of the first image processing system 54. Actually a processing for determining the exposure condition of the film 10 and producing an exposure condition signal EX is carried out before the nonlinearity compensating processing but the processing will be described later.

The gray-balance-adjusted image signals DRc, DGc and DBc output from the gray balance adjusting section 54a are input into a RGB/HVS conversion section 54b and converted to a hue signal DH, a brightness signal DV and a chroma signal DS which respectively represent the hue, brightness and chroma of each picture element. Though this conversion is based on the concept as that for obtaining the hue, brightness and chroma described above in conjunction with FIGS. 5 and 6, the method of this conversion will be described in detail with reference to FIGS. 17 and 18, hereinbelow.

Figure 17:
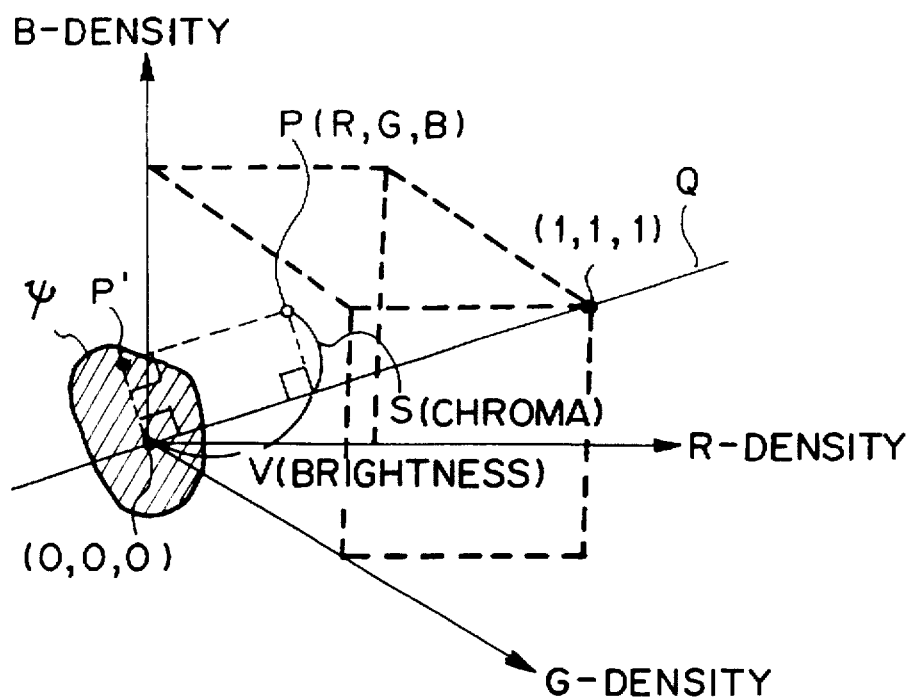
FIG. 17 is a view for illustrating a color density space employed in the adjustment of the brightness and chroma of a print.
Figure 18:
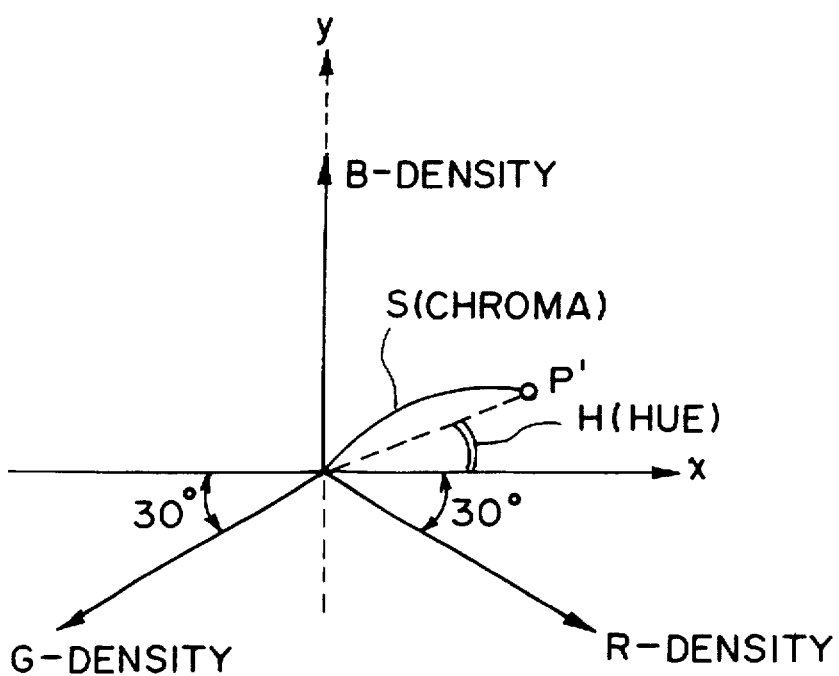
FIG. 18 is a graph for illustrating a color difference space employed in the adjustment of the brightness and chroma of a print.

Considering a RGB density space shown in FIG. 17, all the density points P (R,G,B) represented by the image signals DRc, DGc and DBc in the RGB density space are mapped onto a plane $\psi$. The plane $\psi$ is a plane defined by R+G+B=0, that is, the plane which is normal to straight line Q (gray axis) and includes the origin (0,0,0). An x-y coordinate system such as shown in FIG. 18 is set on the color difference plane $\psi$ thus defined, and when the mapping of the density point P (R,G,B) represented by the image signal components for a given picture element is P', the hue H for the picture element is defined by the angle $\theta$ which the straight line passing through the point P' and the origin makes to x-axis and the chroma S for the picture element is defined by the distance of the point P' from the origin. Further the brightness V is defined by the distance of the density point P from the color difference plane ψ (the distance as measured in parallel to the gray axis Q as shown in FIG. 17.

On the basis of the concept described above, the densities R, G and B are converted to the brightness V, the chroma S and the hue H according to, for instance, the following formulae.

$$V = (R + G + B)/3$$

$$S = \sqrt{x^2 + y^2}$$

$$H = \tan^{-1}(y/x) + n\pi \text{(wherein if } y > 0, n = 0, \text{ if } y < 0, n = 1)$$

$$x = \sqrt{2/3} \ (R - G)\cos 30°$$

$$y = \sqrt{2/3} \ |B - (R + G)\sin 30°|$$

Practically it is preferred that a table in which the brightness V, the chroma S and the hue H are related to various combinations of densities R, G and B be prepared in advance and the brightness V, the chroma S and the hue H be obtained on the basis of the values of image signal components of the image signals DR, DG and DB referring to the table.

As shown in FIG. 16, the brightness signal DV representing the brightness V is input into a brightness adjustment section 54c and a chroma adjustment section 54d, the chroma signal DS representing the chroma S is input into the chroma adjustment section 54d and the hue signal DH representing the hue H is input into a HVS/RGB conversion section 54e to be described later.

In the brightness adjustment section 54c, a nonlinear conversion processing for increasing and decreasing the brightness is carried out on the brightness signal DV. In the nonlinear conversion processing, the brightness signal DV is converted to an output brightness signal DVo according to nonlinear characteristics shown in FIG. 19A. The conversion characteristics shown in FIG. 19A is inverse to the exposure-color forming density characteristics of the negative film 10 shown in FIG. 19B.

The nonlinear conversion processing will be described in more detail, hereinbelow. When the film 10 is properly exposed and the range of the amount of exposure is in the proper range indicated at WE in FIG. 19B, only the substantially linear portion of the characteristic curve of the film 10 is used. The color forming density range of the film 10, which corresponds to the ranges of the image signals DRc, DGc and DBc and accordingly to the range of the brightness signal DV, at this time is the range indicated at WD.

To the contrast, when the film 10 is underexposed and the range of the amount of exposure is in the range indicated at WE', a portion including the "toe portion" of the characteristic curve of the film 10 is used and the color forming density range of the film 10 is the range indicated at WD', whereby the dynamic ranges of the image signals DRc, DGc and DBc are compressed. When an image is recorded by use of such image signals DRc, DGc and DBc, the recorded image becomes poor in contrast in the low density region. When the image signals DRc, DGc and DBc obtained from an underexposed film is processed to uniformly enhance the contrast in order to overcome such a problem, the recorded image becomes unnaturally high in contrast in the middle density region.

Figure 19A:
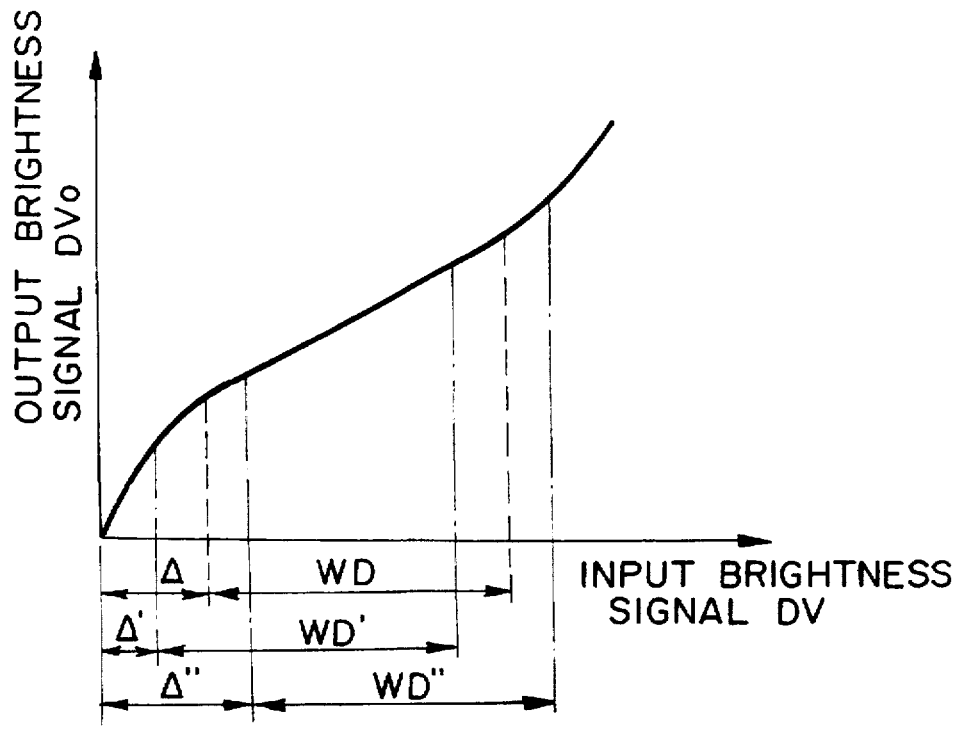
FIGS. 19A and 19B are graphs for illustrating conversion of the signal representing the brightness in adjustment of the brightness of a print.
Figure 19B:
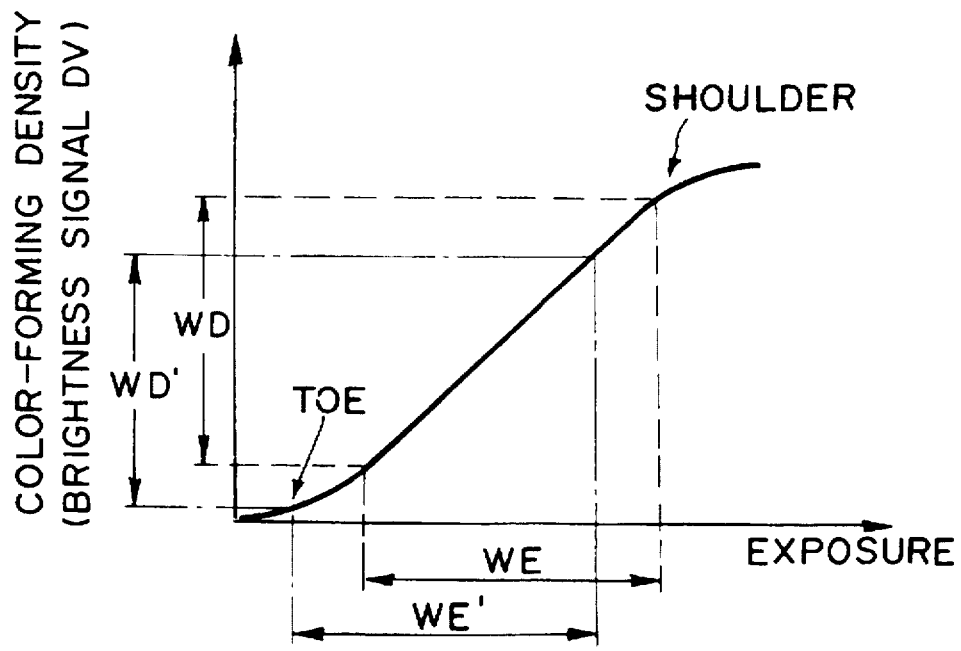

In order to prevent such a problem, the input brightness signal DV is converted to the output brightness signal DVo according to the nonlinear characteristics shown in FIG. 19A which is inverse to the characteristics of the film 10 shown in FIG. 19B. At this time how to set the range of the brightness signal DV to be input into the nonlinear characteristics involves a problem. That is, in the case of an input brightness signal DV obtained from a properly exposed film, the range of the brightness signal DV to be input into the nonlinear characteristics should be set so that the minimum brightness signal level falls on a point at distance Δ from the origin as indicated at WD in FIG. 19A. In the case of an input brightness signal DV obtained from an underexposed film, the range of the brightness signal DV to be input into the nonlinear characteristics should be set so that the minimum brightness signal level falls on a point at distance Δ' from the origin as indicated at WD' in FIG. 19A.

In the processing of this embodiment, the exposure signal EX representing the exposure condition of the film 10 is input into the brightness adjustment section 54c in order to properly determining the range of the brightness signal DV to be input into the nonlinear characteristics. As the exposure signal EX, for instance, a value obtained by subtracting a measured base density of the negative film 10 from the minimum of the densities represented by the image signals DR, DG and DB. (The process of obtaining the exposure signal EX will be described in detail later.) The brightness adjustment section 54c properly determines the range of the brightness signal DV to be input into the nonlinear characteristics on the basis of the exposure signal EX and converts the brightness signal DV to an output brightness signal DVo according to the nonlinear conversion characteristics shown in FIG. 19A.

In the chroma adjustment section 54d, a conversion processing for increasing and decreasing the chroma is carried out on the chroma signal DS. This processing is for converting the input chroma signal DS to an output chroma signal DSo by multiplying the input chroma signal DS by a gain Gn. The characteristics of variation of the gain Gn is changed according to the brightness signal DV, that is, the part of the characteristic curve of the film 10 used. That is, the conversion processing is carried out so that the chroma on the low brightness side is decreased when the film is underexposed and the chroma on the high brightness side is increased when the film is overexposed.

By printing an image on the photographic paper 90 on the basis of the output chroma signal DSo, for instance, when printing an underexposed film, the print can be prevented from being granularly tinged by decreasing the chroma of low brightness picture elements. Further when printing an overexposed film, deterioration in chroma of the high brightness picture elements can be compensated for.

Figure 20:
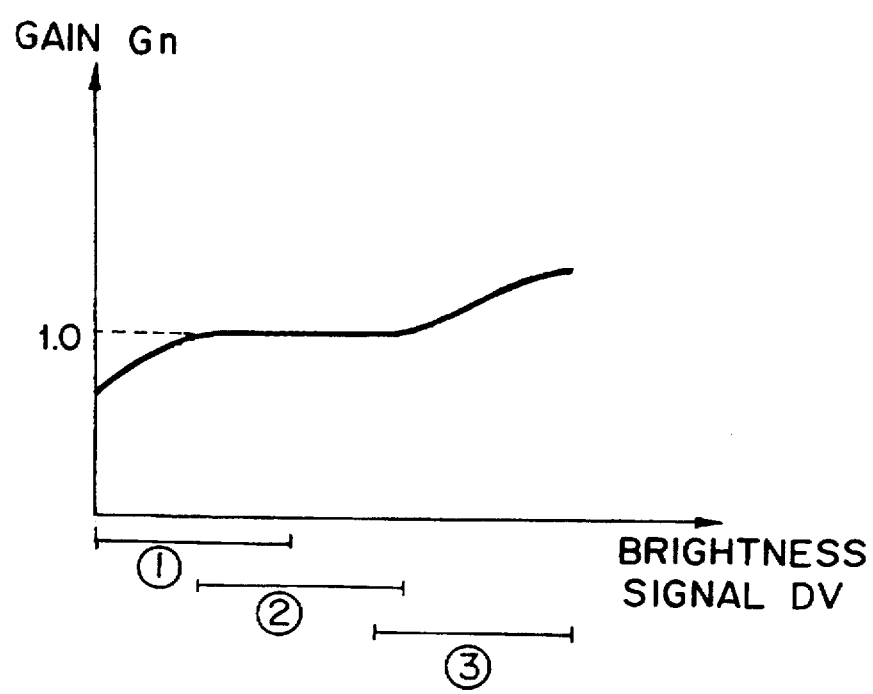
FIG. 20 is a graph for illustrating conversion of the signal representing the chroma in adjustment of the chroma of a print.

Also in this case, the range of the brightness signal DV to be input should be properly determined with respect to the characteristics of variation of the gain Gn. That is, when printing a properly exposed film 10, it is not necessary to adjust the chroma and accordingly the range of the brightness signal DV to be input may be set as indicated at ② in FIG. 20. However, in order to overcome the problem for an underexposed film, the range of the brightness signal DV to be input should be set as indicated at ① in FIG. 20. Further in order to overcome the problem for an overexposed film, the range of the brightness signal DV to be input should be set as indicated at ③ in FIG. 20.

Accordingly, the exposure signal EX is also input into the chroma adjustment section 54d as shown in FIG. 16 and the chroma adjustment section 54d properly determines the range of the brightness signal DV to be input and determines what part of the characteristics of variation of the gain Gn is to be used.

The brightness signal DVo and the chroma signal DSo thus obtained are input into the HVS/RGB conversion section 54e together the hue signal DH as shown in FIG. 16. The HVS/RGB conversion section 54e converts the hue signal DH, the brightness signal DVo and the chroma signal DSo to image signals Dr, Dg and Db representing the red, green and blue densities of each picture element. This conversion is inverse to that carried out by the RGB/HVS conversion section 54b.

Since the brightness signal DVo and the chroma signal DSo before converted to the image signals Dr, Dg and Db have been changed with the brightness and the chroma independently from each other, a print recorded on the photographic paper 90 on the basis of the image signals Dr, Dg and Db can be finished in desirable brightness and chroma irrespective of the exposure condition of the film 10.

Figure 21:
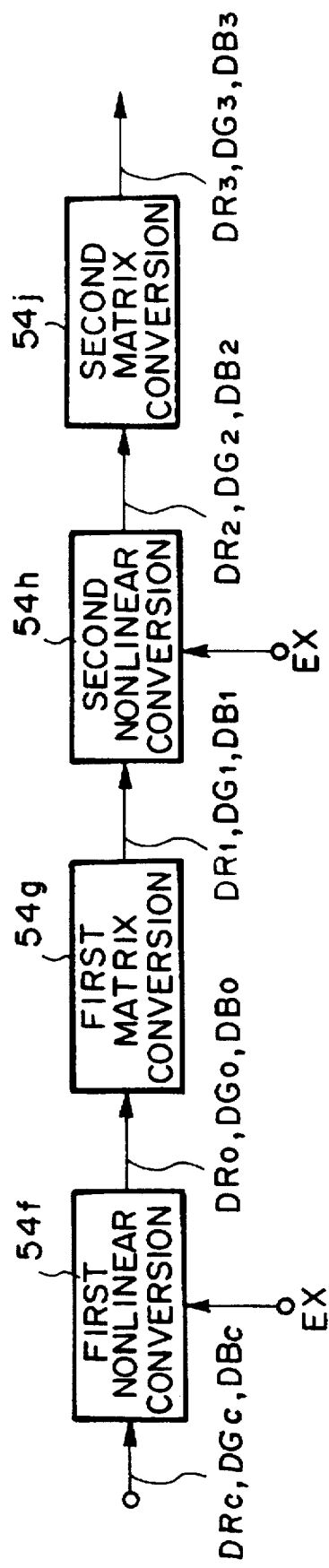
FIG. 21 is a block diagram showing another example of the system concerned to adjustment of the brightness and chroma of a print.
Figure 22:
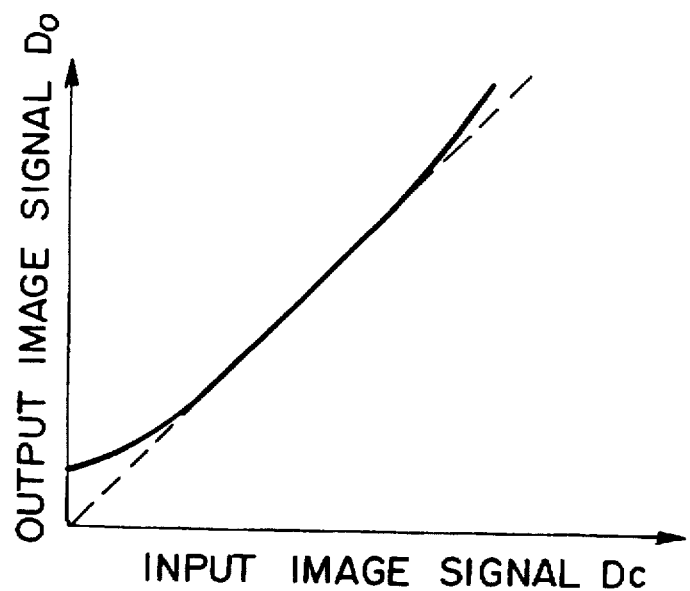
FIG. 22 is a view for illustrating the first nonlinear conversion carried out on the image signals in adjustment of the brightness of a print.
Figure 23:
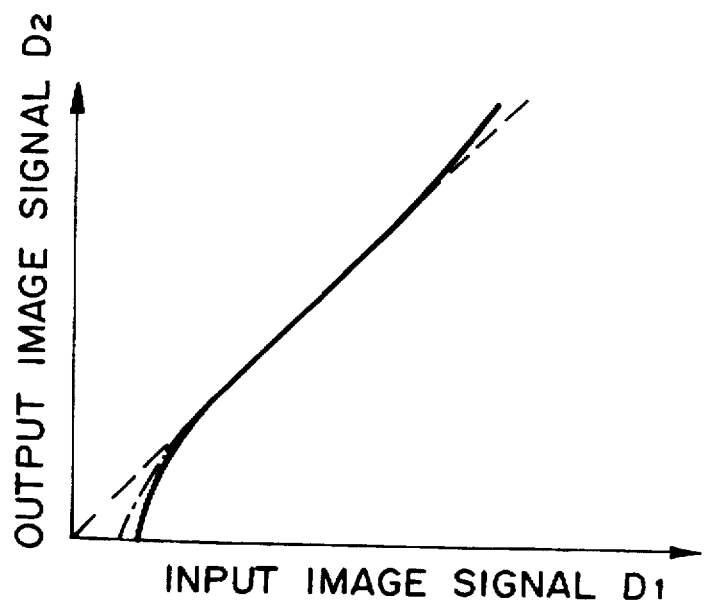
FIG. 23 is a view for illustrating the second nonlinear conversion carried out on the image signals in adjustment of the brightness of a print.

Another example of the processing for compensating for nonlinearity of the exposure-color-forming density characteristics of the color film 10 will be described with reference to FIGS. 21 to 23, hereinbelow. FIG. 21 shows an arrangement which can be employed in the first image processing system 54 in place of the RGB/HVS conversion section 54b, the brightness adjustment section 54c, the chroma adjustment section 54d and the HVS/RGB conversion section 54e shown in FIG. 16.

As shown in FIG. 21, the gray-balance-adjusted digital image signals DRc, DGc and DBc are input into a first nonlinear conversion section 54f and subjected to a nonlinear conversion processing. In this nonlinear conversion processing, the digital image signals DRc, DGc and DBc are converted to output image signals Do according to the characteristics shown by the solid line in FIG. 22. (In FIG. 22, the image signals DRc, DGc and DBc are represented by an input image signal Dc) The broken line in FIG. 22 shows characteristics according to which the input image signal Dc is equal to the output image signal Do. As can be seen from comparison of the solid line and the broken line, the conversion characteristics shown by the solid line compress the image signals DRc, DGc and DBc in the low brightness range and somewhat expand the same in the high brightness range.

The nonlinearly converted image signals DRo, DGo and DBo are input into a first matrix conversion section 54g and subjected to a matrix conversion processing. When the red, green and blue densities respectively represented by the image signals DRo, DGo and DBo are represented by R, G and B, the matrix conversion processing is for converting the densities R, G and B to densities R', G' and B' by the following matrix multiplication.

$$\begin{vmatrix} R' \\ G' \\ B' \end{vmatrix} = \begin{vmatrix} 1.2 & -0.1 & -0.1 \\ -0.1 & 1.2 & -0.1 \\ -0.1 & -0.1 & 1.2 \end{vmatrix} \begin{vmatrix} R \\ G \\ B \end{vmatrix}$$

The image signals representing the matrix-converted densities R', G' and B' will be represented by DR1, DG1 and DB1, hereinbelow. Other matrixes having elements other than 1.2 and −0.1 may be used in this matrix conversion.

By this matrix conversion, the differences between the R', G' and B' become larger than those between the densities R, G and B before the matrix conversion and the degree of enlargement is larger as the differences between the densities R, G and B before the matrix conversion are larger, that is, the degree of enlargement is larger in higher chroma picture elements.

Thus the chroma of the picture elements represented by the image signals DR1, DG1 and DB1 become higher than those represented by the image signals DRo, DGo and DBo in whole. However since the image signals DRo, DGo and DBo have been subjected to the processing described above in the first nonlinear conversion section 54f and the differences between the densities R, G and B have been compressed in the low brightness range, the chroma of most picture elements in the low brightness range is hardly increased in the chase of an underexposed film.

The image signals DR1, DG1 and DB1 are then input into a second nonlinear conversion section 54h to be subjected to a nonlinear conversion processing. In this nonlinear conversion processing, the digital image signals DR1, DG1 and DB1 are converted to output image signals D2 according to the characteristics shown by the solid line in FIG. 23. (In FIG. 23, the image signals DR1, DG1 and DB1 are represented by an input image signal D1) The broken line in FIG. 23 shows characteristics according to which the input image signal D1 is equal to the output image signal D2. As can be seen from comparison of the solid line and the broken line, the conversion characteristics shown by the solid line increase the contrast in the low brightness range and the high brightness range as the nonlinear conversion characteristics shown in FIG. 19A.

Since the conversion characteristics used in the second nonlinear conversion section 54h are set so that the contrast in the low brightness range is increased more than by the conversion characteristics (shown by the chained line in FIG. 23) inverse to that used in the first nonlinear conversion characteristics 54f, the reduction in contrast in the low brightness range due to the nonlinear conversion processing by the first nonlinear conversion section 54f is cancelled and moreover the contrast in the low brightness range is increased.

The image signals DR2, DG2 and DG2 which have been subjected to the second nonlinear conversion processing are input into a second matrix conversion section 54j to be subjected a matrix conversion processing. The second matrix conversion section 54j converts the image signals DR2, DG2 and DG2 using a matrix inverse to the aforesaid matrix used in the first matrix conversion section 54g (i.e., the matrix having 1.2 and −0.1 as elements).

The chromas of the picture elements represented by the image signals DR3, DG3 and DB3 which are obtained by converting the image signals DR2, DG2 and DB2 in the second matrix conversion section 54j are all lower than those represented by the image signals DR2, DG2 and DB2. However when the chromas represented by the image signals DR3, DG3 and DB3 are compared with those represented by the image signals DRo, DGo and DBo before converted by the first matrix conversion section 54g, the chromas are kept unchanged in the intermediate chroma ranges, that is, the effects of the two matrix conversion processings are cancelled with each other, are increased in the high chroma range and decreased in the low chroma range.

In this manner, the image signals DR3, DG3 and DB3 are obtained by changing the brightness and the chroma represented by the image signals DRc, DGc and DBc independently from each other. Accordingly a print recorded on the photographic paper 90 according to the image signals DR3, DG3 and DB3 can be finished in optimal brightness and chroma irrespective of the exposure condition of the film 10.

Another processing for determining the exposure condition of the film 10 which determines the exposure condition not on the basis of the base density of the film will be described hereinbelow.

The image processing system 54 first creates a histogram of densities represented by image signal components of the image signals DR, DG and DB. The histogram is like one shown in FIG. 4 but in this case only one histogram is created for all the image signals DR, DG and DB. Then the first image processing system 54 obtains the density Dmin at a point at which the signal level of the image signals is minimized (as a particular point) and the dynamic range R of the image signal DR, DG and DB. The dynamic range R can be obtained as the difference between the density Dmin and the density Dmax at a point at which the signal level of the image signals is maximized. Since the Dmin may be considered to correspond to a shadow point, i.e., the darkest point in the image, the density Dmin will be referred to as "the shadow point density SD", hereinbelow.

As can be understood from the description above, the exposure condition of the film 10 can be determined on the basis of the position where the shadow point density SD is on the vertical axis in FIG. 19B. The position of the shadow point density SD is obtained letting the position be replaced by z. For this purpose, the first image processing system 54 stores therein random functions such as shown in FIGS. 24A and 24B.

Figure 24A:
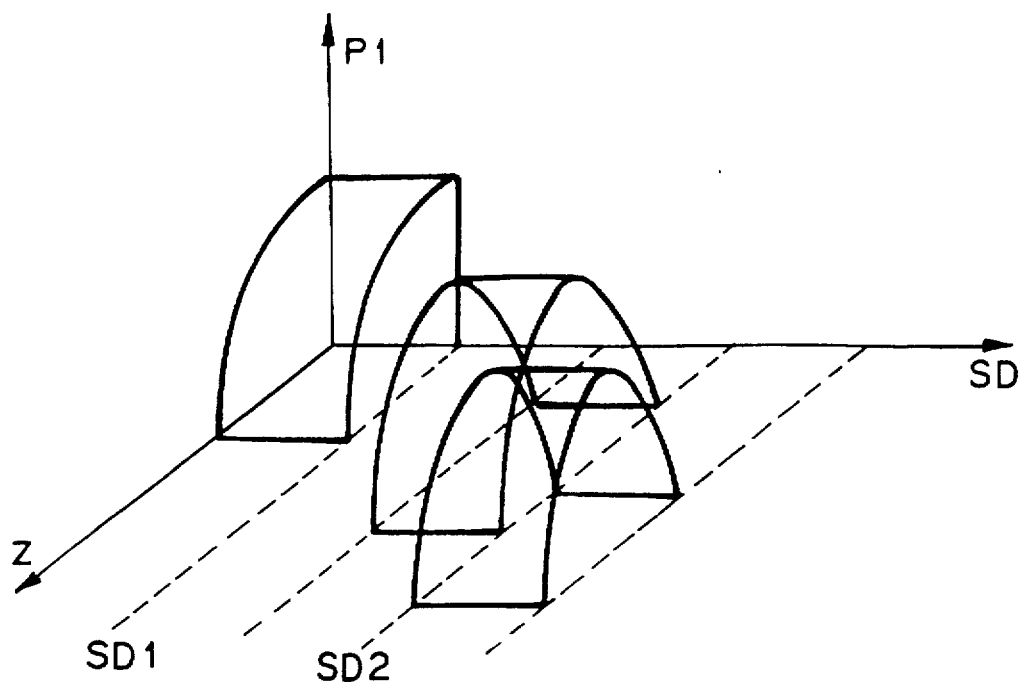
FIG. 24A and 24B are graphs for illustrating random functions which are employed for determination of the exposure condition.

The random function shown in FIG. 24A is a function which defines probability P1 of the position z which the shadow point density SD can take by value of the shadow point density SD. The function is defined so that there is a probability that the shadow point density SD takes a relatively small value of z when the shadow point density SD is in the range smaller than a first predetermined density SD1, there is a probability that the shadow point density SD takes a relatively large value of z when the shadow point density SD is in the range larger than a second predetermined density SD2, and there is a probability that the shadow point density SD takes an intermediate value of z when the shadow point density SD is in the range between the first and second predetermined densities SD1 and SD2.

Figure 24B:
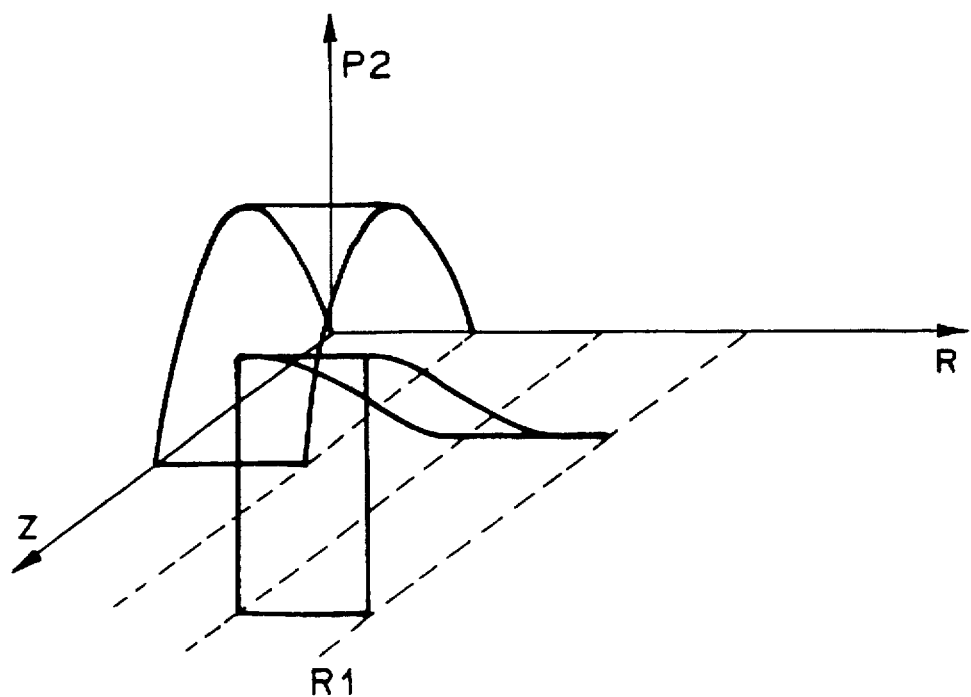

The random function shown in FIG. 24B is a function which defines probability P2 of the position z which the shadow point density SD can take by value of the dynamic range R. The function is defined so that there is a probability that the shadow point density SD takes a relatively small value of z or a relatively large value of z when the dynamic range R is in the range smaller than a predetermined value R1. The random function such as shown in FIGS. 24A and 24B may be empirically defined by kind of film.

The first image processing system 54 obtains the shadow point density SD and the dynamic range R in the manner described above and obtains the probabilities P1 of values of z based on the value of the shadow point density SD and the probabilities P2 of values of z based on the value of the dynamic range R. Then the first image processing system 54 obtains the value of z which maximizes the product P(z) of the probabilities P1 and P2.

The value of z thus obtained is relatively small for an underexposed film and relatively large for an overexposed film. Accordingly, whether the film is underexposed or overexposed can be determined on the basis of the value of z. The value of z as it is or a value obtained by multiplying the value of z by an appropriate coefficient may be employed as the exposure signal EX.

Though, in the example described above, the shadow point is employed as the particular point on the histogram and the shadow point density SD is compared with first and second predetermined densities P1 and P2 in order to determine whether the film is underexposed or overexposed, other particular point on the histogram, for instance, a highlight point may be employed as the particular point on the histogram.

The image signals which have been subjected to the processing for compensating for nonlinearity of the exposure-color-forming density characteristics of the color film, that is, the image signals Dr, Dg and Db output from the HVS/RGB conversion section 54e (FIG. 16) or the image signals DR3, DG3 and DB3 output from the second matrix conversion section 54j (FIG. 21) are then subjected to a processing for adjusting the brightness of the print according to predetermined characteristics determined on the basis of the scene of photography.

In order to avoid complication of explanation, the image signals Dr, Dg and Db, or the image signals DR3, DG3 and DB3 will be represented by DR, DG and DB, hereinbelow.

Figure 25:
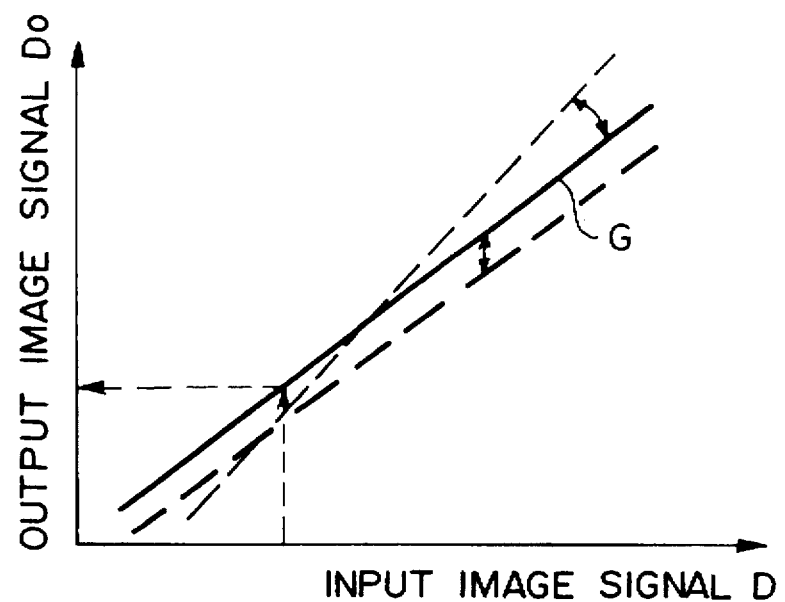
FIG. 25 is a graph for illustrating the gradation processing related to the adjustment of the brightness of a print.

The first image processing system 54 carries out a gradation processing on the digital image signals DR, DG and DB in order to adjust the brightness of the print. In the gradation processing, the input digital image signal D (DR, DG or DB) is converted to an output image signal Do, for instance, according to gradation conversion characteristics shown by line G in FIG. 25. By changing the gradation conversion characteristics so that the inclination of line G changes, the overall gradation of the printed image recorded on the photographic paper 90 by the three color beams modulated by the gradation-processed image signals DR, DG and DB can be enhanced or weakened. Further when the gradation conversion characteristics are changed so that line G is shifted in the direction of the ordinate axis in FIG. 25, the overall brightness of the printed image on the photographic paper 90 can be adjusted.

In order to set the brightness of the printed image to a desired value, the first image processing system 54 first obtains characteristic values (brightness, hue and chroma) represented by the image signals DR, DG and DB for all the picture elements. The characteristic values can be obtained by the method described above in conjunction with FIGS. 5 and 6.

After the characteristic values (brightness, hue and chroma) represented by the image signals DR, DG and DB are obtained for all the picture elements, a reference picture element which may be considered to correspond to an especially dark or bright background portion in the scene is specified. For this purpose, the picture elements forming the scene are selected one by one in sequence along a path the same as the path of raster scan and the brightness of each picture element is compared with a first predetermined brightness close to the shadow or a second predetermined brightness close to a highlight and the chroma of each picture element is compared with a predetermined chroma. A picture element whose brightness is not higher than the first predetermined brightness or not lower than the second predetermined brightness and at the same time whose chroma is not higher than the predetermined chroma is adopted as the reference picture element. Then the brightness, hue, chroma and the position of the reference picture element are stored in a memory.

Then taking into account the position of each picture element on the scene, picture elements which may be considered to correspond to the same background portion as the reference picture element are extracted. For this purpose, the color information (hue and chroma) on the eight picture elements adjacent to the reference picture element (horizontally, vertically and obliquely adjacent to the reference picture element) is checked. When the differences in hue and chroma from the reference picture element are both within acceptable ranges, the picture element is considered to correspond to the same background portion as the reference picture element and the position of the picture element is stored in the memory. The brightness of the picture element may be taken into account in addition to the hue and the chroma. That is, the picture element may be considered to correspond to the same background portion as the reference picture element when the difference in hue, chroma and brightness from the reference picture element are all within acceptable ranges.

Then the hue and the chroma of the eight picture elements adjacent to the newly adopted reference picture element are checked. When the differences in hue and chroma from the newly adopted reference picture element are both within the acceptable ranges, the picture element is considered to correspond to the same background portion as the reference picture element and the position of the picture element is stored in the memory.

The processing is repeated until there remains no adjacent picture element whose differences in hue and chroma from the reference picture element are both within the acceptable ranges.

By the processing described above, a group of picture elements forming a continuous background region in the scene is detected. Then in a part of the scene away from the picture element group, the same procedure is effected to detect another group of picture elements forming a continuous background region.

By carrying out the procedure over the entire area of the scene, all the picture elements corresponding to an especially dark or bright background portion in the scene can be extracted, if any.

Then the first image processing system 54 excludes the image signal components for the picture elements corresponding to such a background portion from the image signals DR, DG and DB, thereby obtaining image signals DR', DG' and DB'.

Then the first image processing system 54 divides the picture elements into a plurality of groups on the basis of the image signals DR', DG' and DB' so that the picture elements in each group form a continuous region in the image and the color differences (difference in hue and chroma) among the picture elements in each group are within a predetermined value.

Such picture element groups can be obtained in the manner similar to that for obtaining the background portion picture elements. However in this case, since the reference picture element from which grouping of the picture elements is initiated is not determined on the basis a particular hue or chroma, the initial reference picture element may be the picture element on an extremity of the image and when one picture element group can be specified, a picture element which is outside the group and adjacent to the group may be adopted as a new reference picture element.

Thus the picture elements other than the picture elements corresponding to an especially dark or bright background portion are all divided into a plurality of picture element groups.

Thereafter the first image processing system 54 calculates the mean of the densities represented by the image signal components of the image signals DR', DG' and DB' by use of the picture element groups. For this purpose, the first image processing system 54 first calculates the mean density of each of the picture element groups. This mean density is an arithmetic mean obtained by dividing the sum of the densities of the picture elements in the group by the number of the picture elements in the group. When the picture element groups are numbered as j=1, 2, 3 . . . , and the mean density of the number j picture element group and the number of the picture elements in the number j picture element group are respectively represented by A(j) and N(j), the first image processing system 54 calculates the mean density Ao of the overall image as Ao=$\Sigma$A(j)·F{N(j)}/$\Sigma$F{N(j)}, wherein F{N} is a function of the number of the picture elements such as shown by the solid line in FIG. 26. The function F{N} takes a value equal to the number N of the picture elements when the number N of the picture elements in a picture element group is not larger than a predetermined value Nc and is fixed to the predetermined value Nc when the number N of the picture elements in the picture element group exceeds the predetermined value Nc.

If the arithmetic mean density Am of the overall image is calculated from the aforesaid means densities A(j) of the picture element groups and the number N(j) of the picture elements in the respective groups, the mean density Am of the overall image is expressed as Am=$\Sigma$A(j)·N(j)/$\Sigma$N(j) and as the number N of the picture elements in a certain picture element group increases, the weight of the mean density of the group on the mean density Am of the overall image increases. To the contrast, when the picture element number limit function F(N) is introduced into calculation of the mean density Ao of the overall image, the mean density A (i.e., the image signal components of the image signals DR', DG' and DB') of the picture elements to the number by which the number of the picture elements in the picture element group is larger than the predetermined value Nc has no weight on calculation of the mean image density Ao.

The first image processing system 54 carries out the aforesaid gradation processing so that the mean image density Ao thus obtained becomes a predetermined print density (e.g., 0.7 in optical density), thereby determining the brightness of the print. Thus the print can be finished in a desirable brightness without greatly affected by a large object other than the main object.

Further since the mean image density Ao is obtained from the image signal components of the image signals DR', DG' and DB' which do not contain the image signal components for an especially bright or dark background portion, the print can be finished in a desirable brightness without affected by such a background portion.

Figure 26:
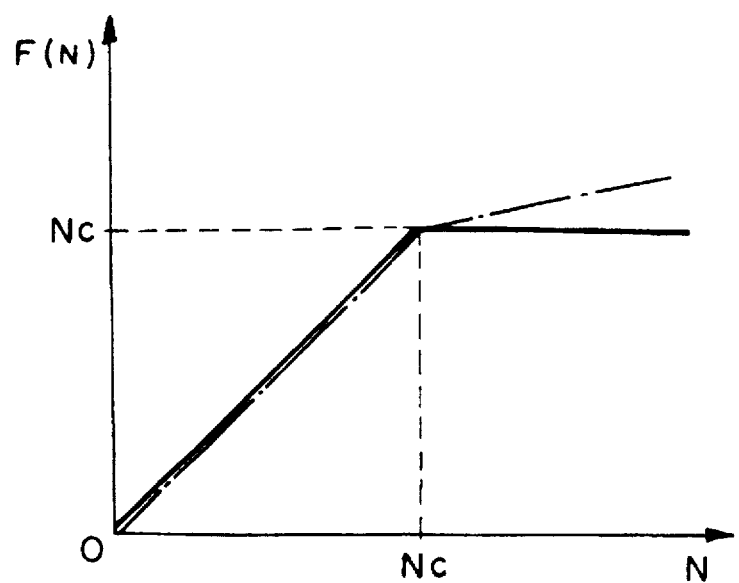
FIG. 26 is a graph for illustrating a picture element number limit function employed in the brightness adjustment of a print.

A picture element number limit function F(N) shown by the chained line in FIG. 26 may be employed in place of that shown by the solid line in FIG. 26. In the picture element number limit function F(N) shown by the chained line, the number of the picture elements by which the number of the picture elements in a picture element group is larger than the predetermined value Nc is considered to be smaller than the actual value. In this case, the mean density A of the picture elements to the number by which the number of the picture elements in the picture element group is larger than the predetermined value Nc has a weight on calculation of the mean image density Ao to some extent.

Another example of the processing for preventing the mean image density Ao, which affects the brightness of the print, from being greatly affected by a large object other than the main object will be described in detail, hereinbelow. Though description will be made on the image signals DR, DG and DB hereinbelow, the processing to be described may be carried out on the image signals DR', DG' and DB' obtained by excluding the image signal components for a background portion from the image signals DR, DG and DB.

Figure 27:
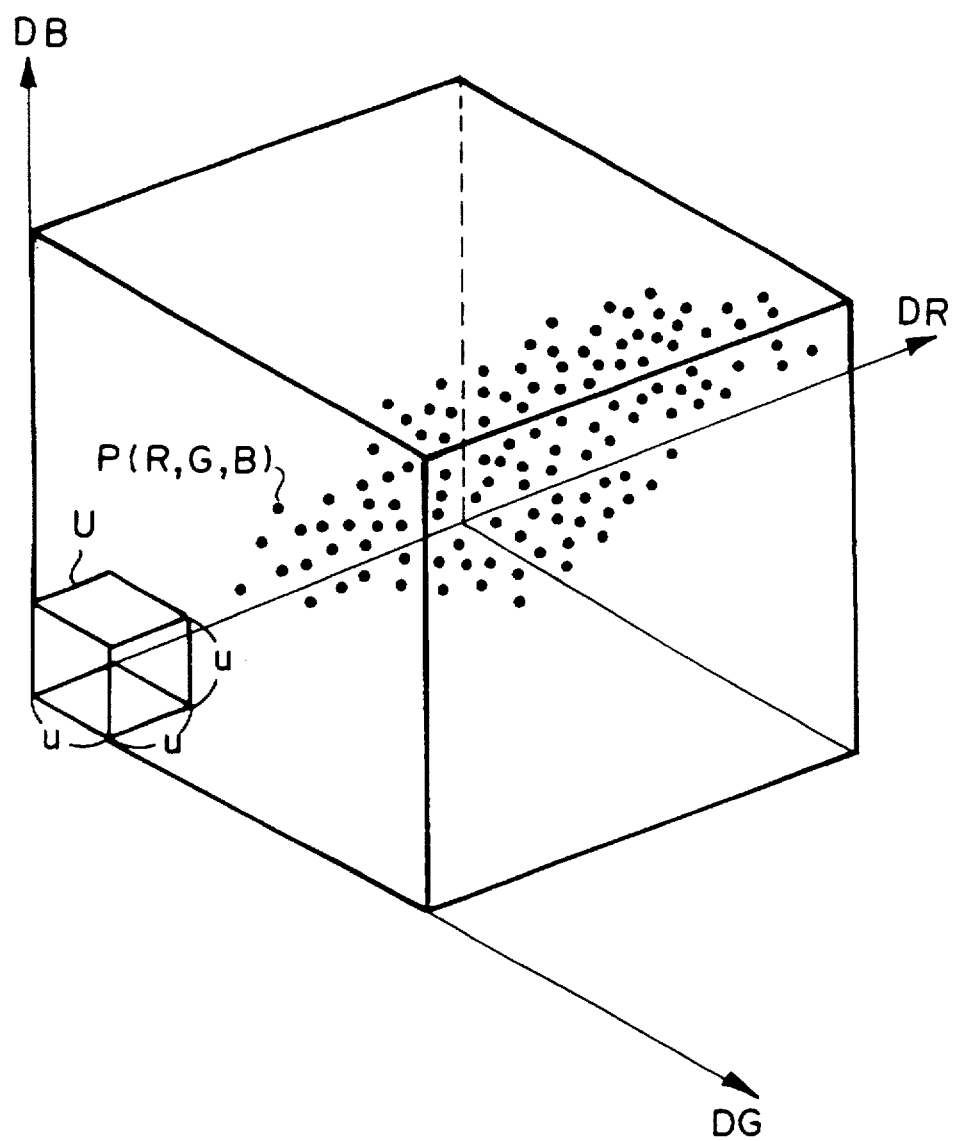
FIG. 27 is a schematic view for illustrating a three-dimensional histogram of the image signals employed in the brightness adjustment of a print.

The first image processing system 54 first creates a three-dimensional histogram of the image signal components of the image signals DR, DG and DB. The histogram is obtained by plotting the values of the image signal components of the respective picture elements in a space such as shown in FIG. 27. Point P in FIG. 27 is a point whose values of the image signal components of the image signals DR, DG and DB are R, G and B, respectively.

Then the first image processing system 54 divides the region of the three-dimensional histogram into a plurality of units Uj (J=1, 2, 3 . . . ) defined by widths u of the image signal components DR, DG and DB and calculates the mean density in each unit U. The mean density is an arithmetic mean obtained by dividing the sum of the densities of the picture elements in the unit (the picture elements whose values of the image signal components fall within the unit) by the number of the picture elements in the unit.

When the mean density of the number j unit and the number of the picture elements in the number j unit are respectively represented by A(j) and N(j), the first image processing system 54 calculates the mean density Ao of the overall image as Ao=ΣA(j)·F{N(j)}/ΣF{N(j)}, wherein F{N} is a function of the number of the picture elements such as shown by the solid line in FIG. 26.

Accordingly also in this example, the mean density A of the picture elements to the number by which the number of the picture elements in the unit is larger than the predetermined value Nc has no weight on calculation of the mean image density Ao. Accordingly by determining the brightness of the print on the basis of the mean image density Ao thus obtained, the print can be finished in a desirable brightness without affected by a large object other than the main object.

The image signals Dr, Dg and Db output from the HVS/RGB conversion section 54e (FIG. 16) or the image signals DR3, DG3 and DB3 output from the second matrix conversion section 54j (FIG. 21) may be subjected to a processing for adjusting the contrast of the print according to predetermined characteristics determined on the basis of the scene of photography before subjected to the brightness adjustment processing. The contrast adjustment is carried out by use of a contrast correction value which is determined on the basis of the dynamic range R' of the image signals Dr, Dg and Db the image signals DR3, DG3 and DB3 according to the characteristics shown in FIG. 28.

What is claimed is:

1. In a photographic printer in which red, green and blue light beams are modulated respectively according to red, green and blue image signals DR, DG and DB each made up of image signal components CR, CG and CB representing densities of the corresponding color of respective picture elements obtained by reading out an image recorded on a color photographic film, and a color image is recorded on a color photosensitive material by scanning the photosensitive material with the modulated light beams, an image processing method comprising the steps of carrying out on the red, green and blue image signals DR, DG and DB a calibration processing for substantially equalizing the gray scales for the respective colors, carrying out on the processed red, green and blue image signals DR, DG and DB a gray balance adjustment for adjusting image signal components CR, CG and CB of the red, green and blue image signals DR, DG and DB representing a gray object to represent the same density, carrying out a processing for determining an exposure condition of the color photographic film on the basis of the red, green and blue image signals DR, DG and DB, carrying out on the gray-balance-adjusted red, green and blue image signals DR, DG and DB a processing for compensating for nonlinearity of the exposure-color-forming density characteristics of the color film according to the determined exposure condition of the color film, and carrying out on the thus processed red, green and blue image signals DR, DG and DB a processing for adjusting the brightness of the print according to predetermined characteristics determined on the basis of the scene of photography.

2. An image processing method as defined in claim 1 in which said calibration processing is carried out by carrying out a γ-conversion processing on at least one of the red, green and blue image signals DR, DG and DB with conversion characteristics which are fixed for each color so that the differences between the densities represented by the image signal components CR, CG and CB of the red, green and blue image signals DR, DG and DB representing a gray object become constant irrespective of the amount of exposure.

3. An image processing method as defined in claim 1 in which said gray balance adjustment comprises a step of detecting, on the basis of image signals D1, D2 and D3, which correspond to the red, green and blue image signals DR, DG and DB without limiting to this order, picture elements which are of chroma higher than a predetermined chroma, and excluding the image signal components DC1, DC2 and DC3 for the detected picture elements and picture elements which are adjacent to the detected picture elements and the hue differences from the detected picture elements of which are within a predetermined value, from the image signals D1, D2 and D3, thereby obtaining low chroma image signals D1', D2' and D3' made up of image signal components DC1', DC2' and DC3' for low chroma picture elements, a step of obtaining shadow points D1s, D2s and D3s and highlight points D1h, D2h and D3h in the low chroma image signals D1', D2' and D3' thereby obtaining dynamic ranges for the respective colors, and correcting the highlight point D1h, D2h or D3h, when the differences between the dynamic ranges for the respective colors are not within an acceptable value, so that the dynamic ranges for the respective colors are equalized, a step of detecting picture elements which are of the same value in one of the image signal components DC1' and DC2' for low chroma picture elements and averaging the values of the other of the image signal components DC1' and DC2', thereby obtaining sets of image signal component pairs (DC1", DC2"), the image signal component pairs (DC1", DC2") in each set being of the same value in one of the image signal components DC1" and DC2" and of the averaged value in the other of the image signal components DC1" and DC2", a step of detecting picture elements which are of the same value in one of the image signal components DC3' and DC2' and averaging the values of the other of the image signal components DC3' and DC2', thereby obtaining sets of image signal component pairs (DC3", DC2"), the image signal component pairs (DC3", DC2") in each set being of the same value in one of the image signal components DC3" and DC2" and of the averaged value in the other of the image signal components DC3" and DC2", a step of obtaining a relation between the densities of the two colors on the basis of the sets of image signal component pairs (DC1", DC2"), the shadow point (D1s, D2s) and the highlight point (D1h, D2h) and carrying out a linear conversion on at least one of the image signals D1 and D2 on the basis of the relation between the densities of the two colors obtained so that the image signals D1 and D2 are equalized over the entire range, and a step of obtaining a relation between the densities of the two colors on the basis of the sets of image signal component pairs (DC3", DC2"), the shadow point (D3s, D2s) and the highlight point (D3h, D2h) and carrying out a linear conversion on at least one of the image signals D3 and D2 on the basis of the relation between the densities of the two colors obtained so that the image signals D3 and D2 are equalized over the entire range.

4. An image processing method as defined in claim 3 in which picture elements at a specific first hue are selected from the low chroma picture elements and the image signals D1' and D2' are obtained from the image signal components DC1', DC2' and DC3' for the selected picture elements while picture elements at a specific second hue different from the first hue are selected from the low chroma picture elements and the image signals D3' and D2' are obtained from the image signal components DC1', DC2' and DC3' for the selected picture elements.

5. An image processing method as defined in claim 4 in which when the image signals D1, D2 and D3 respectively represent the red density, the green density and the blue density, picture elements at a hue from blue to yellow are selected as the picture elements at the first hue for obtaining the relation between the green density and the red density and picture elements at a hue from red to cyan are selected as the picture elements at the second hue for obtaining the relation between the green density and the blue density.

6. An image processing method as defined in claim 3 in which said two linear conversion processings are so carried out that when the relation between the densities of the two colors obtained on the basis of the sets of image signal component pairs (DC1", DC2"), the shadow point (D1s, D2s) and the highlight point (D1h, D2h) is given by $Y=\alpha_1 \cdot X+\beta_1$ in a X-Y coordinate system, the image signal D2 is kept unchanged and the image signal D1 is converted to D1c as $D1c=\alpha_1 \cdot D1+\beta_1$ and when the relation between the densities of the two colors obtained on the basis of the sets of image signal component pairs (DC3", DC2"), the shadow point (D3s, D2s) and the highlight point (D3h, D2h) is given by $Y=\alpha_3 \cdot X+\beta_3$ in a X-Y coordinate system, the image signal D2 is kept unchanged and the image signal D3 is converted to D3c as $D3c=\alpha_3 \cdot D3+\beta_3$.

7. An image processing method as defined in claim 1 in which said processing for determining an exposure condition of the color photographic film comprises the steps of creating a histogram of densities represented by image signal components CR, CG and CB of the image signals DR, DG and DB, obtaining the density at a particular point on the histogram and the dynamic ranges of the image signals DR, DG and DB, determining that the photographic film was underexposed when the density of the particular point is smaller than a first predetermined density and at the same time the dynamic ranges of the image signals DR, DG and DB are smaller than a predetermined value, and determining that the photographic film was overexposed when the density of the particular point is larger than a second predetermined density and at the same time the dynamic ranges of the image signals DR, DG and DB are smaller than a predetermined value.

8. An image processing method as defined in claim 1 in which said processing for compensating for nonlinearity of the exposure-color-forming density characteristics of the color film comprises a step of converting the image signals DR, DG and DB to signals representing the hue, brightness and chroma of each picture element, a step of determining a range of application of the characteristics inverse to the exposure-color-forming characteristics of the film on the basis of the exposure condition of the film determined and carrying out a conversion processing for changing the brightness according to the inverted characteristics on the signal representing the brightness, a step of carrying out a conversion processing for changing the chroma on the signal representing the chroma independently from the conversion processing for changing the brightness, and a step of converting the processed signals representing the brightness and the chroma and the signal representing the hue to image signals each made up of image signal components representing the red, green or blue densities of picture elements.

9. An image processing method as defined in claim 1 in which said processing for compensating for nonlinearity of the exposure-color-forming density characteristics of the color film comprises a step of carrying out first and second nonlinear conversion processings on the image signals DR, DG and DB for changing the brightness represented by the image signals DR, DG and DB in a part of the brightness range, and a step of carrying out first and second matrix processings for changing throughout the chroma represented by the image signals DR, DG and DB respectively between the first and second nonlinear conversion processings and after completion of the second nonlinear conversion processing, one of the first and second matrix processings being for increasing the chroma and the other for decreasing the chroma, the characteristics of the first and second nonlinear conversion processings being determined according to the exposure condition so that the nonlinearity of the exposure-color-forming density characteristics of the color film is compensating for as a result of the two nonlinear conversion processings.

10. An image processing method as defined in claim 9 in which the second matrix processing is carried out by use of a matrix inverse to the matrix used in the first matrix processing.

11. An image processing method as defined in claim 1 in which said processing for adjusting the brightness of the print is carried out by detecting on the basis of the image signals DR, DG and DB, picture elements which are of brightness not higher than a first predetermined brightness close to the shadow or not lower than a second predetermined brightness close to a highlight and are of chroma not higher than a predetermined chroma, excluding the image signal components CR, CG and CB for the detected picture elements and picture elements which form a continuous region in the image together with the detected picture elements and the color differences from the detected picture elements of which are within a predetermined value from the image signals DR, DG and DB, thereby obtaining image signals DR', DG' and DB', and adjusting the brightness of the photographic print on the basis of the mean of the densities represented by the image signal components CR', CG' and CB' of the image signals DR', DG' and DB'.

12. An image processing method as defined in claim 1 in which the brightness of the photographic print is adjusted on the basis of the mean of the densities represented by the image signal components CR, CG and CB of the image signals DR, DG and DB calculated in such a manner that the picture elements are divided into a plurality of groups on the basis of the image signals DR, DG and DB so that the picture elements in each group form a continuous region in the image and the color differences among the picture elements in each group are within a predetermined value, and when the number of the picture elements in a group is larger than a predetermined value, weights put on the densities of picture elements in the group to the number by which the number of the picture elements in the group is larger than the predetermined value in calculation of the mean density are reduced.

13. An image processing method as defined in claim 1 in which the brightness of the photographic print is adjusted on the basis of the mean of the densities represented by the image signal components CR, CG and CB of the image signals DR, DG and DB calculated in such a manner that a three-dimensional histogram of densities represented by image signal components CR, CG and CB of the image signals DR, DG and DB is created, the number of the picture elements included in respective units which are defined by predetermined widths of the image signals DR, DG and DB in the three-dimensional histogram are obtained, and when the number of the picture elements in a unit is larger than a predetermined value, weights put on the densities of picture elements in the unit to the number by which the number of the picture elements in the unit is larger than the predetermined value in calculation of the mean density are reduced.

14. An image processing method as defined in claim 1 in which the brightness of the photographic print is adjusted by detecting, on the basis of the image signals DR, DG and DB, picture elements which are of brightness not higher than a first predetermined brightness close to the shadow or not lower than a second predetermined brightness close to a highlight and are of chroma not higher than a predetermined chroma, excluding the image signal components CR, CG and CB for the detected picture elements and picture elements which form a continuous region in the image together with the detected picture elements and the color differences from the detected picture elements of which are within a predetermined value from the image signals DR, DG and DB, thereby obtaining image signals DR', DG' and DB', adjusting the brightness of the photographic print on the basis of the mean of the densities represented by the image signal components CR', CG' and CB' of the image signals DR', DG' and DB' calculated by dividing the picture elements into a plurality of groups on the basis of the image signals DR', DG' and DB' so that the picture elements in each group form a continuous region in the image and the color differences among the picture elements in each group are within a predetermined value, and reducing weights put on the densities of picture elements in a group, which includes picture elements larger than a predetermined value in number, to the number by which the number of the picture elements in the group is larger than the predetermined value.

15. An image processing method as defined in claim 1 in which the brightness of the photographic print is adjusted by detecting, on the basis of the image signals DR, DG and DB, picture elements which are of brightness not higher than a first predetermined brightness close to the shadow or not lower than a second predetermined brightness close to a highlight and are of chroma not higher than a predetermined chroma, excluding the image signal components CR, CG and CB for the detected picture elements and picture elements which form a continuous region in the image together with the detected picture elements and the color differences from the detected picture elements of which are within a predetermined value from the image signals DR, DG and DB, thereby obtaining image signals DR', DG' and DB', adjusting the brightness of the photographic print on the basis of the mean of the densities represented by the image signal components CR', CG' and CB' of the image signals DR', DG' and DB' calculated by creating a three-dimensional histogram of densities represented by image signal components CR', CG' and CB' of the image signals DR', DG' and DB', obtaining the number of the picture elements included in respective units which are defined by predetermined widths of the image signals DR', DG' and DB' in the three-dimensional histogram, and by reducing weights put on the densities of picture elements in a unit, which includes picture elements larger than a predetermined value in number, to the number by which the number of the picture elements in the unit is larger than the predetermined value.

16. An image processing method as defined in claim 1 in which the red, green and blue image signals DR, DG and DB which have been subjected to the processing for compensating for nonlinearity of the exposure-color-forming density characteristics of the color film are further subjected to a processing for adjusting the contrast of the print according to predetermined characteristics determined on the basis of the scene of photography.

* * * * *